United States Patent
Wu et al.

(10) Patent No.: US 12,335,006 B2
(45) Date of Patent: Jun. 17, 2025

(54) CSI MEASUREMENT METHOD AND APPARATUS

(71) Applicant: Huawei Technologies Co., Ltd., Shenzhen (CN)

(72) Inventors: Ye Wu, Shenzhen (CN); Xiaoyan Bi, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 390 days.

(21) Appl. No.: 17/663,727

(22) Filed: May 17, 2022

(65) Prior Publication Data
US 2022/0278726 A1    Sep. 1, 2022

Related U.S. Application Data

(63) Continuation of application No. PCT/CN2020/115128, filed on Sep. 14, 2020.

(30) Foreign Application Priority Data

Nov. 18, 2019    (CN) .......................... 201911130321.2

(51) Int. Cl.
*H04B 7/06*          (2006.01)
*H04L 5/00*          (2006.01)
(Continued)

(52) U.S. Cl.
CPC ......... *H04B 7/0626* (2013.01); *H04L 5/0051* (2013.01); *H04W 24/10* (2013.01); *H04W 72/044* (2013.01)

(58) Field of Classification Search
CPC ... H04B 7/0626; H04B 7/0456; H04L 5/0051; H04L 5/0007; H04L 5/0094;
(Continued)

(56) References Cited

U.S. PATENT DOCUMENTS

| 2018/0205440 A1 | 7/2018 | Enescu et al. |
| 2019/0132099 A1 | 5/2019 | Wu et al. |

(Continued)

FOREIGN PATENT DOCUMENTS

| CN | 101808409 A | 8/2010 |
| CN | 105429683 A | 3/2016 |

(Continued)

OTHER PUBLICATIONS

Xincheng Zhang, "Uplink Signal Optimization," in LTE Optimization Engineering Handbook, IEEE, 2017, pp. 721-740 (Year: 2017).*

(Continued)

*Primary Examiner* — Justin T Van Roie
(74) *Attorney, Agent, or Firm* — Slater Matsil, LLP

(57) ABSTRACT

This application provides a CSI measurement method and an apparatus. In the method, a terminal determines N (N is an integer greater than 1) RS groups, and sends the N RS groups to a network device. The network device receives the N RS groups sent by the terminal, and measures CSI based on at least one RS group in the N RS groups. The N RS groups each include a first RS used to measure the CSI and a second RS used to measure the CSI. Each of the first RS and the second RS in each RS group occupies one time-frequency resource segment. The time-frequency resource segment includes one time-domain resource segment and one frequency-domain resource segment. Frequency-domain resource segments occupied by different RS groups do not overlap. Time-domain resource segments occupied by different RS groups do not overlap.

20 Claims, 23 Drawing Sheets

(51) Int. Cl.
*H04W 24/10* (2009.01)
*H04W 72/044* (2023.01)

(58) Field of Classification Search
CPC .... H04L 5/0048; H04L 5/0057; H04W 24/10; H04W 72/044
See application file for complete search history.

(56) References Cited

U.S. PATENT DOCUMENTS

2019/0149295 A1 5/2019 Wang et al.
2020/0313747 A1* 10/2020 Xu ..................... H04B 7/0617

FOREIGN PATENT DOCUMENTS

| | | | |
|---|---|---|---|
| CN | 107294643 | A | 10/2017 |
| CN | 107371194 | A | 11/2017 |
| CN | 108023699 | A | 5/2018 |
| CN | 109151887 | A | 1/2019 |
| EP | 3565349 | A1 | 11/2019 |
| WO | 2013060306 | A1 | 5/2013 |
| WO | 2018137256 | A1 | 8/2018 |

OTHER PUBLICATIONS

Ericsson, "Dynamic CSI-RS Design and Overhead Reduction", 3GPP TSG-RAN WG1#85, R1-165406, Nanjing, China, May 23-27, 2016, 6 pages.

* cited by examiner

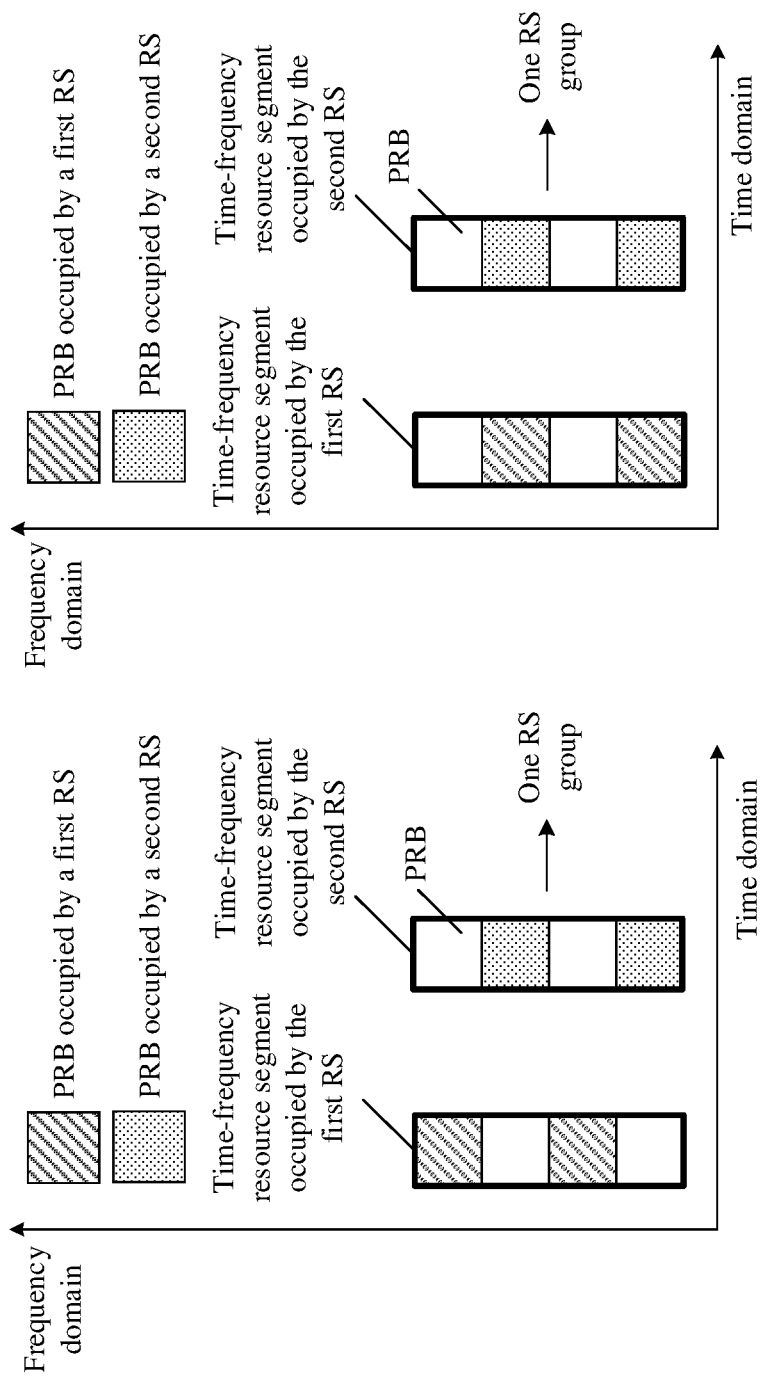

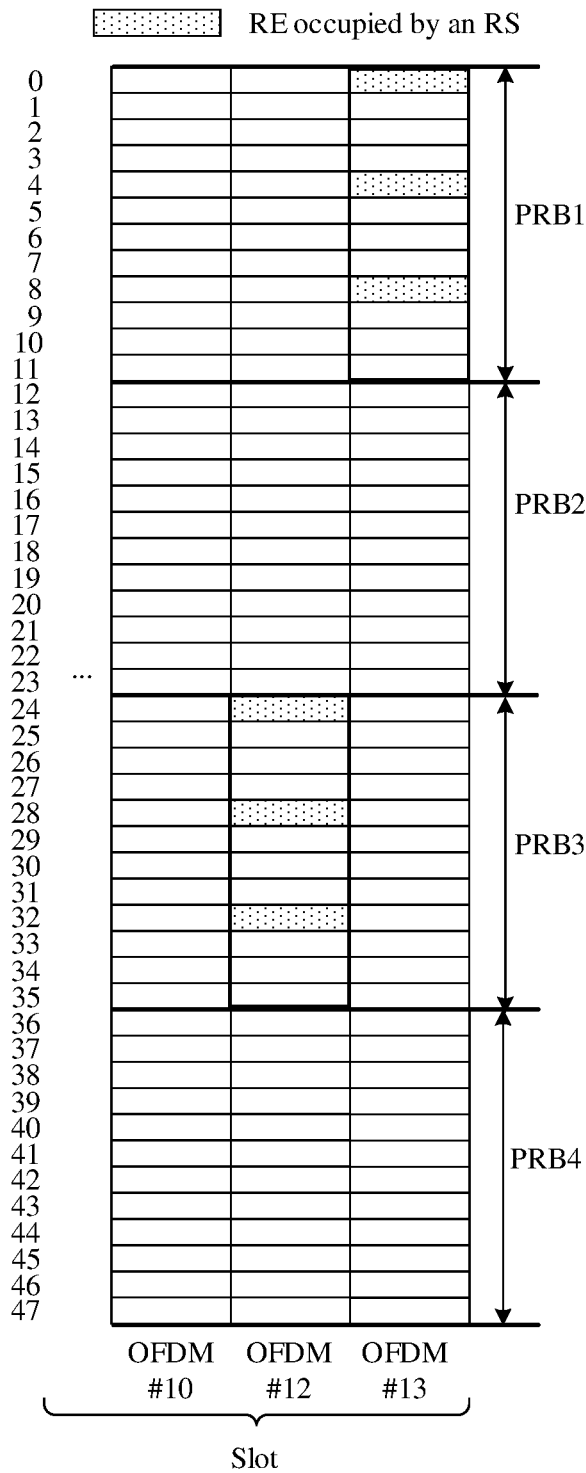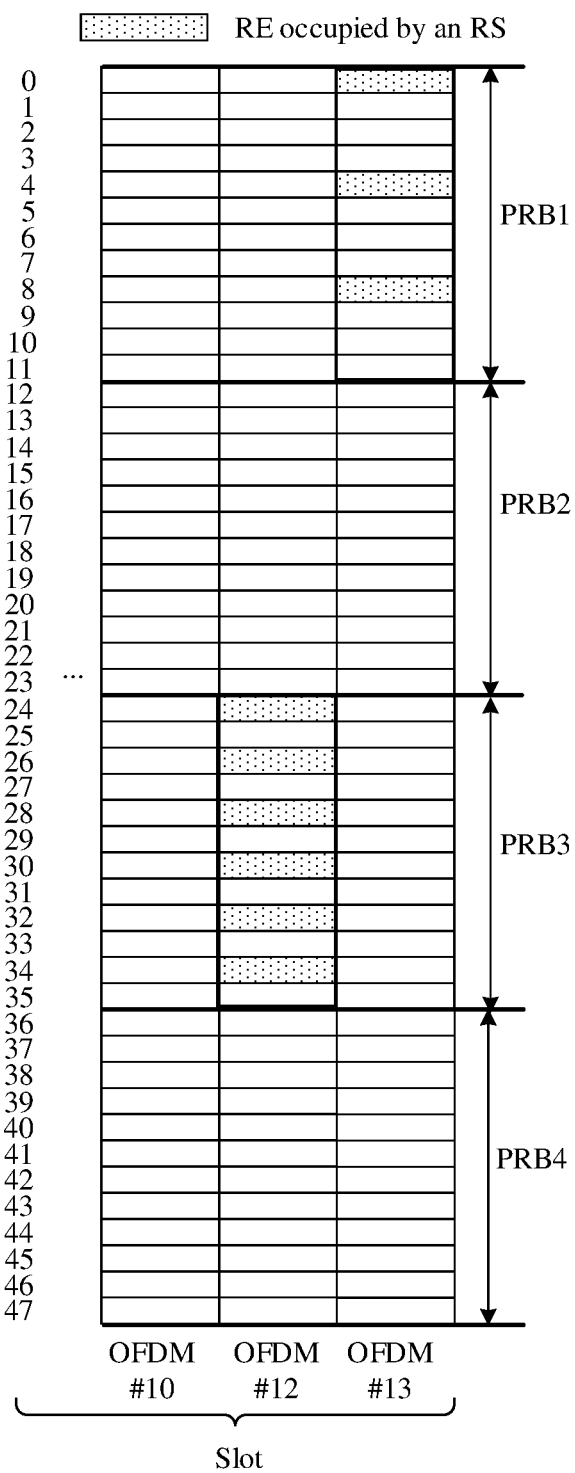
FIG. 19(a)                    FIG. 19(b)

CSI MEASUREMENT METHOD AND APPARATUS

CROSS-REFERENCE TO RELATED APPLICATIONS

This application is a continuation of International Application No. PCT/CN2020/115128, filed on Sep. 14, 2020, which claims priority to Chinese Patent Application No. 201911130321.2, filed on Nov. 18, 2019. The disclosures of the aforementioned applications are hereby incorporated by reference in their entireties.

TECHNICAL FIELD

This application relates to the field of communication technologies, and in particular to a channel state information (CSI) measurement method and an apparatus.

BACKGROUND

In a current technology, a terminal may send a sounding reference signal (SRS) to a base station, so that the base station obtains uplink CSI by using the received SRS, determines downlink CSI based on the uplink CSI, and further determines a precoding matrix based on the downlink CSI. After precoding a physical downlink shared channel (PDSCH) based on the precoding matrix, the base station sends the precoded physical downlink shared channel to the terminal.

In a case, the terminal may periodically send the SRS. Assuming that a sending period of the SRS is x milliseconds (ms), and preparation time for the base station to send the PDSCH is y ms, as shown in FIG. 1, a maximum interval between time for the base station to send the PDSCH and time for the base station to receive the SRS is (x+y) ms. Once being configured, a value of x is fixed. A value of y is usually a fixed value. In this case, in a scenario in which the terminal moves (mobility), because a channel between the terminal and the base station changes rapidly, the base station may obtain the uplink CSI through measurement by using the received SRS, and obtain the downlink CSI (denoted as first downlink CSI) through calculation based on the uplink CSI, and the first downlink CSI has been far different from downlink CSI (denoted as second downlink CSI) that exists when the PDSCH is sent. Correspondingly, the precoding matrix determined based on the first downlink CSI is no longer a precoding matrix that best matches the second downlink CSI. In this case, a downlink throughput decreases.

Inaccurate measurement of uplink CSI due to a rapid channel change further leads to a problem that the precoding matrix determined based on the first downlink CSI is not the precoding matrix that best matches the second downlink CSI, which may be referred to as channel aging. Due to the existence of channel aging, the effect of interference suppression by precoding is deteriorated. In a multi-user (MU) scenario, channel aging greatly increases interference between multiple users.

SUMMARY

Embodiments of this application provide a CSI measurement method and an apparatus, to improve accuracy of CSI estimation and prediction, and further increase a downlink throughput.

To achieve the foregoing objective, embodiments of this application provide the following technical solutions.

According to a first aspect, a CSI measurement method is provided. The method includes: A network device receives N RS groups sent by a terminal, and measures CSI based on at least one RS group in the N RS groups, where N is an integer greater than 1. The N RS groups each include a first RS used to measure the CSI and a second RS used to measure the CSI. Each of the first RS and the second RS in each RS group occupies one time-frequency resource segment. The time-frequency resource segment includes one time-domain resource segment and one frequency-domain resource segment. Frequency-domain resource segments occupied by different RS groups do not overlap. Time-domain resource segments occupied by different RS groups also do not overlap. According to the method provided in the first aspect, the network device may obtain, through joint measurement that is based on the first RS and the second RS, downlink CSI that exists when a PDSCH is sent, to obtain instantaneous CSI of the terminal in a scenario in which the terminal moves. Then, the network device determines a precoding matrix that better matches the current downlink CSI, and precodes, based on the precoding matrix, the PDSCH sent to the terminal, to avoid channel aging and improve receiving quality of receiving the PDSCH by the terminal. In a frequency hopping case, distribution of the first RSs and the second RSs on physical resources proposed in this application enables RSs in a same RS group to be used for joint measurement, to improve accuracy of CSI estimation and prediction, and further increase a downlink throughput.

With reference to the first aspect, in a possible implementation, the method further includes: The network device sends, to the terminal, configuration information used to configure a time-frequency resource of at least one of the first RS and the second RS. The time-frequency resource includes a time-domain resource and a frequency-domain resource. That is, the configuration information is about a time-frequency resource occupied by an RS. In this possible implementation, the network device configures time-frequency resources of RSs in an RS group for the terminal, so that the terminal determines time-frequency resources for sending the first RS and the second RS.

According to a second aspect, a network device is provided. The network device includes a transceiver unit and a processing unit. The transceiver unit is configured to receive N RS groups sent by a terminal. The processing unit is configured to measure CSI based on at least one RS group in the N RS groups, where N is an integer greater than 1. The N RS groups each include a first RS used to measure the CSI and a second RS used to measure the CSI. Each of the first RS and the second RS in each RS group occupies one time-frequency resource segment. The time-frequency resource segment includes one time-domain resource segment and one frequency-domain resource segment. Frequency-domain resource segments occupied by different RS groups do not overlap. Time-domain resource segments occupied by different RS groups do not overlap.

With reference to the second aspect, in a possible implementation, the transceiver unit is further configured to send, to the terminal, configuration information used to configure a time-frequency resource of at least one of the first RS and the second RS. The time-frequency resource includes a time-domain resource and a frequency-domain resource. That is, the configuration information is about a time-frequency resource occupied by an RS.

According to a third aspect, a CSI measurement method is provided. The method includes: A terminal determines N RS groups, and sends the N RS groups to a network device, where N is an integer greater than 1. The N RS groups each include a first RS used to measure CSI and a second RS used to measure the CSI. Each of the first RS and the second RS in each RS group occupies one time-frequency resource segment. The time-frequency resource segment includes one time-domain resource segment and one frequency-domain resource segment. Frequency-domain resource segments occupied by different RS groups do not overlap. Time-domain resource segments occupied by different RS groups also do not overlap. According to the method provided in the third aspect, the terminal may send the N RS groups to the network device. The network device obtains, through joint measurement that is based on first RSs and second RSs of the received N RS groups, downlink CSI when a PDSCH is sent, to obtain instantaneous CSI of the terminal in a scenario in which the terminal moves. Then the network device determines a precoding matrix that better matches the current downlink CSI, and precodes, based on the precoding matrix, the PDSCH sent to the terminal, to avoid channel aging and improve receiving quality of receiving the PDSCH by the terminal. In a frequency hopping case, distribution of the first RSs and the second RSs on physical resources proposed in this application enables RSs in a same RS group to be used for joint measurement, to improve accuracy of CSI estimation and prediction, and further increase a downlink throughput.

With reference to the third aspect, in a possible implementation, the method further includes: The terminal receives, from the network device, configuration information used to configure a time-frequency resource of at least one of the first RS and the second RS. The time-frequency resource includes a time-domain resource and a frequency-domain resource. That is, the configuration information is about a time-frequency resource occupied by an RS. In this possible implementation, the terminal may determine, based on the configuration information sent by the network device, time-frequency resources for sending the first RS and the second RS.

According to a fourth aspect, a terminal is provided. The terminal includes a transceiver unit and a processing unit. The processing unit is configured to determine N RS groups. The transceiver unit is configured to send the N RS groups to a network device, where N is an integer greater than 1. The N RS groups each include a first RS used to measure CSI and a second RS used to measure the CSI. Each of the first RS and the second RS in each RS group occupies one time-frequency resource segment. The time-frequency resource segment includes one time-domain resource segment and one frequency-domain resource segment. Frequency-domain resource segments occupied by different RS groups do not overlap. Time-domain resource segments occupied by different RS groups also do not overlap.

With reference to the fourth aspect, in a possible implementation, the transceiver unit is further configured to receive, from the network device, configuration information used to configure a time-frequency resource of at least one of the first RS and the second RS. The time-frequency resource includes a time-domain resource and a frequency-domain resource. That is, the configuration information is about a time-frequency resource occupied by an RS.

With reference to the method provided in the first aspect, the network device provided in the second aspect, the method provided in the third aspect, or the terminal provided in the fourth aspect, in a possible implementation, the first RS and the second RS in each RS group occupy a same frequency-domain resource segment. In this possible implementation, CSI measurement may be performed on a frequency-domain resource segment occupied by one RS group by using a first RS and a second RS in the RS group.

With reference to the method provided in the first aspect, the network device provided in the second aspect, the method provided in the third aspect, or the terminal provided in the fourth aspect, in a possible implementation, the first RSs are periodically distributed in time domain.

With reference to the method provided in the first aspect, the network device provided in the second aspect, the method provided in the third aspect, or the terminal provided in the fourth aspect, in a possible implementation, the second RSs are periodically distributed in time domain.

With reference to the method provided in the first aspect, the network device provided in the second aspect, the method provided in the third aspect, or the terminal provided in the fourth aspect, in a possible implementation, time domain periods of the first RSs and the second RSs are the same. In this possible implementation, when the periods of the second RSs and the first RSs are the same, the network device may use CSI prior information measured by using the first RS when the second RS is used to measure the CSI. In this case, a quantity of REs occupied by the second RS may be reduced, to reduce pilot overheads of the second RS.

With reference to the method provided in the first aspect, the network device provided in the second aspect, the method provided in the third aspect, or the terminal provided in the fourth aspect, in a possible implementation, RS groups are periodically distributed in time domain. In this case, it may be understood that the first RSs and the second RSs are also periodically distributed in time domain.

With reference to the method provided in the first aspect, the network device provided in the second aspect, the method provided in the third aspect, or the terminal provided in the fourth aspect, in a possible implementation, in each RS group, a location of the first RS in the occupied time-frequency resource segment is different from a location of the second RS in the occupied time-frequency resource segment.

With reference to the method provided in the first aspect, the network device provided in the second aspect, the method provided in the third aspect, or the terminal provided in the fourth aspect, in a possible implementation, the first RS and the second RS in each RS group use a same comb structure in frequency domain.

With reference to the method provided in the first aspect, the network device provided in the second aspect, the method provided in the third aspect, or the terminal provided in the fourth aspect, in a possible implementation, the first RS and the second RS in each RS group use different comb structures in frequency domain. In this possible implementation, the CSI prior information measured by the first RS can be effectively used when the second RS is used to measure the CSI. In this case, a size of the comb structure used by the second RS may be larger than that of the comb structure used by the first RS, to effectively reduce the pilot overheads of the second RS.

With reference to the method provided in the first aspect, the network device provided in the second aspect, the method provided in the third aspect, or the terminal provided in the fourth aspect, in a possible implementation, start locations of the first RS and the second RS in each RS group are the same in frequency domain.

With reference to the method provided in the first aspect, the network device provided in the second aspect, the method provided in the third aspect, or the terminal provided in the fourth aspect, in a possible implementation, start locations of the first RS and the second RS in each RS group are different in frequency domain.

With reference to the method provided in the first aspect, the network device provided in the second aspect, the method provided in the third aspect, or the terminal provided in the fourth aspect, in a possible implementation, the following condition is met between a first time-frequency resource segment and a second time-frequency resource segment: $\mathrm{mod}([(N_{slot}^{frame,\mu}n_{f,1}+n_{s,f,1}^{u}-T_{offset,1})-(N_{slot}^{frame,\mu}n_{f,0}+n_{s,f,0}^{u}-T_{offset,0})],N*T)=0$. The first time-frequency resource segment and the second time-frequency resource segment are respectively time-frequency resource segments occupied by the first RS and the second RS in one RS group, mod is a modulo function, $N_{slot}^{frame,\mu}$ represents a quantity of slots in one radio frame corresponding to a current subcarrier spacing configuration $\mu$, $n_{s,f,1}^{u}$ represents an index of the first transmit slot of the second RS corresponding to the current subcarrier spacing configuration $\mu$, $n_{s,f,0}^{u}$ represents an index of the first transmit slot of the first RS corresponding to the current subcarrier spacing configuration $\mu$, $n_{f,1}$ represents an index of a radio frame in which the first transmit slot of the second RS is located, $n_{f,0}$ represents an index of a radio frame in which the first transmit slot of the first RS is located, an index of a radio frame is a system frame number, $T_{offset,1}$ is a slot offset configured for the second RS, $T_{offset,0}$ is a slot offset configured for the first RS, T represents a time domain period of the first RS or the second RS, and N is a quantity of frequency hopping times in one frequency hopping period. In this possible implementation, after the first slot of the time-frequency resource segment occupied by the first RS and the first slot of the time-frequency resource segment occupied by the second RS meet the formula or an equivalent variation of the formula, a frequency hopping location of the second RS is the same as a frequency hopping location of a closest previous first RS, so that joint measurement can be ensured between the first RS and the second RS.

According to a fifth aspect, a network device is provided. The network device includes a processor. The processor is connected to a memory, the memory is configured to store computer-executable instructions, and the processor executes the computer-executable instructions stored in the memory, to implement any method provided in the first aspect. The memory and the processor may be integrated together, or may be independent components. If the memory and the processor are independent components, the memory may be located in the network device, or may be located outside the network device.

In a possible implementation, the processor includes a logic circuit and at least one of an input interface and an output interface. The output interface is configured to perform a sending action in a corresponding method, and the input interface is configured to perform a receiving action in the corresponding method.

In a possible implementation, the network device further includes a communication interface and a communication bus. The processor, the memory, and the communication interface are connected through the communication bus. The communication interface is configured to perform receiving and sending actions in the corresponding method. The communication interface may also be referred to as a transceiver. Optionally, the communication interface includes at least one of a transmitter and a receiver. In this case, the transmitter is configured to perform the sending action in the corresponding method, and the receiver is configured to perform the receiving action in the corresponding method.

In a possible implementation, the network device exists in a product form of a chip.

According to a sixth aspect, a terminal is provided. The terminal includes a processor. The processor is connected to a memory, the memory is configured to store computer-executable instructions, and the processor executes the computer-executable instructions stored in the memory, to implement any method provided in the third aspect. The memory and the processor may be integrated together, or may be independent components. If the memory and the processor are independent components, the memory may be located in the terminal, or may be located outside the terminal.

In a possible implementation, the processor includes a logic circuit and at least one of an input interface and an output interface. The output interface is configured to perform a sending action in a corresponding method, and the input interface is configured to perform a receiving action in the corresponding method.

In a possible implementation, the terminal further includes a communication interface and a communication bus. The processor, the memory, and the communication interface are connected through the communication bus. The communication interface is configured to perform receiving and sending actions in the corresponding method. The communication interface may also be referred to as a transceiver. Optionally, the communication interface includes at least one of a transmitter and a receiver. In this case, the transmitter is configured to perform the sending action in the corresponding method, and the receiver is configured to perform the receiving action in the corresponding method.

In a possible implementation, the terminal exists in a product form of a chip.

According to a seventh aspect, a communication system is provided. The communication system includes the terminal provided in the second aspect and the network device provided in the fourth aspect.

According to an eighth aspect, a computer-readable storage medium is provided. The computer-readable storage medium includes instructions; and when the instructions are run on a computer, the computer is enabled to perform any method provided in the first aspect or the third aspect.

According to a ninth aspect, a computer program product including instructions is provided. When the instructions are run on a computer, the computer is enabled to perform any method provided in the first aspect or the third aspect.

For technical effects brought by any implementation in the second aspect or the fourth to the ninth aspects, refer to technical effects brought by a corresponding implementation in the first aspect or the third aspect. Details are not described herein again.

It should be noted that various possible implementations of any one of the foregoing aspects may be combined on a premise that the solutions are not contradictory.

BRIEF DESCRIPTION OF THE DRAWINGS

FIG. 5 to FIG. 7(a) and FIG. 7(b) are respectively schematic diagrams of distribution of time-frequency resource segments according to an embodiment of this application;

FIG. 11(a) and FIG. 11(b) to FIG. 14(a) and FIG. 14(b) are respectively schematic diagrams of distribution of first RSs and second RSs in time-frequency resource segments according to an embodiment of this application;

FIG. 15(a) and FIG. 15(b) and FIG. 16(a) and FIG. 16(b) are respectively schematic diagrams of PRBs occupied by a first RS and a second RS in time-frequency resource segments according to an embodiment of this application;

FIG. 18(a) and FIG. 18(b) and FIG. 19(a) and FIG. 19(b) are respectively schematic diagrams of comb structures used by an RS according to an embodiment of this application;

DETAILED DESCRIPTION OF ILLUSTRATIVE EMBODIMENTS

The following describes the technical solutions in embodiments of this application with reference to the accompanying drawings in embodiments of this application. In descriptions of this application, unless otherwise specified, "/" means "or". For example, A/B may represent A or B. In the descriptions of this application, unless otherwise specified, "a plurality of" means two or more than two. In addition, to clearly describe the technical solutions in embodiments of this application, terms such as "first" and "second" are used in embodiments of this application to distinguish between same items or similar items that have basically same functions and purposes. A person skilled in the art may understand that the terms such as "first" and "second" do not limit a quantity or an execution sequence, and the terms such as "first" and "second" do not indicate a definite difference.

Figure 1:
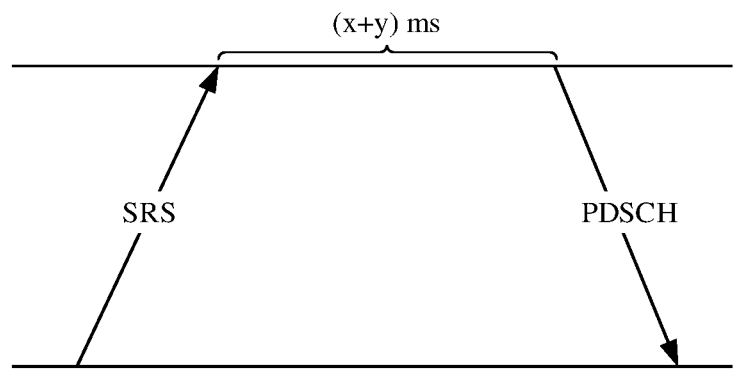
FIG. 1 is a schematic diagram of an interval between time for a network device to receive an SRS and time for the network device to send a PDSCH.
Figure 2:
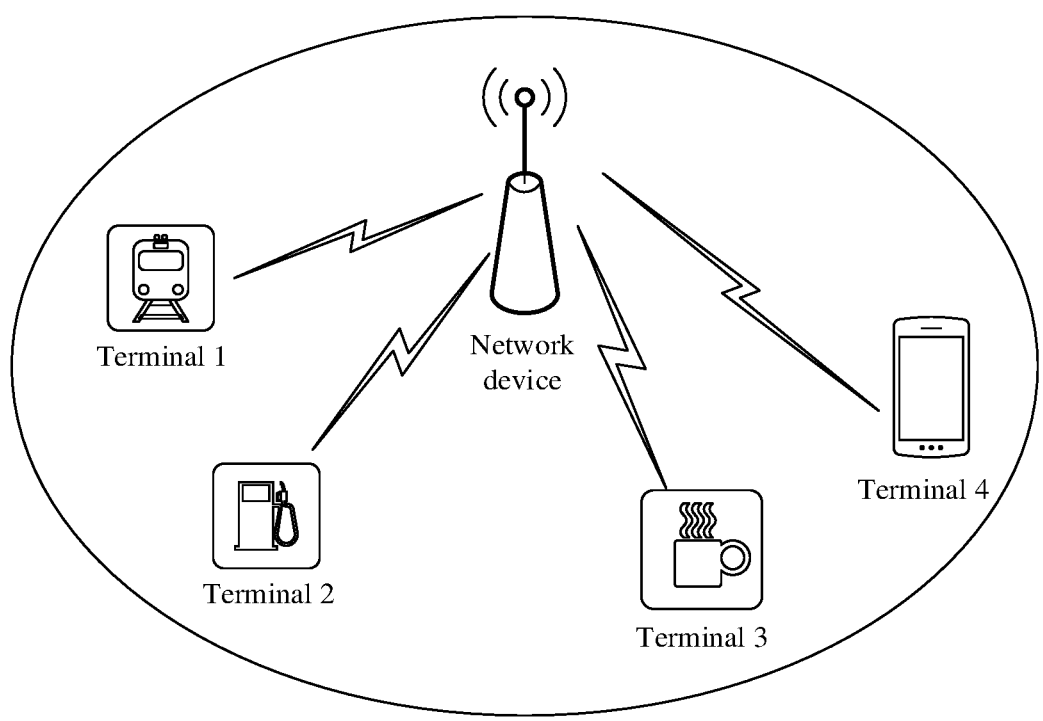
FIG. 2 is a schematic diagram of a network architecture.

Network elements in embodiments of this application include a network device and a terminal. For example, FIG. 2 is a schematic diagram of a communication system to which the technical solutions provided in this application are applicable. The communication system may include at least one network device (FIG. 2 shows only one network device) and at least one terminal (FIG. 2 shows four terminals, which are respectively a terminal 1 to a terminal 4). One or more terminals of the terminal 1 to the terminal 4 may communicate with the network device, to transmit data. The terminal in embodiments of this application may be any terminal that communicates with the network device. It should be noted that the network device and the terminal included in the communication system shown in FIG. 2 are merely an example. In embodiments of this application, types and quantities of the network elements included in the communication system, and connection relationships between the network elements are not limited thereto.

The communication system in embodiments of this application may be a communication system that supports the fourth generation (4G) access technology, such as the long term evolution (LTE) access technology. Alternatively, the communication system may be a communication system that supports the fifth generation (5G) access technology, such as the new radio (NR) access technology. Alternatively, the communication system may be a communication system that supports the third generation (3G) access technology, such as the universal mobile telecommunications system (UMTS) access technology. Alternatively, the communication system may be a communication system that supports a plurality of wireless technologies, for example, a communication system that supports the LTE technology and the NR technology. In addition, the communication system is also applicable to a future-oriented communication technology.

The network device in embodiments of this application may be a device that is on an access network side and that is configured to support a terminal to access a communication system, and may be, for example, an evolved NodeB (eNB) in a communication system that supports a 4G access technology, or a next generation NodeB (gNB), a transmission reception point (TRP), a relay node, an access point (AP), or the like in a communication system that supports a 5G access technology. The network device may be referred to as a base station, a node, an access network device, or the like.

The terminal in embodiments of this application may be a device that provides a user with voice or data connectivity, and the terminal may also be referred to as user equipment (UE), a mobile station, a subscriber unit, a station, or terminal equipment (TE). For example, the terminal may be a cellular phone, a personal digital assistant (PDA), a wireless modem, a handheld device, a laptop computer, a cordless phone, a wireless local loop (WLL), a pad, a smartphone, a customer-premises equipment (CPE), a sensor with a network access function, or the like. With development of wireless communication technologies, any device that can access the communication system, any device that can communicate with a network side in the communication system, or any device that can communicate with another object by using the communication system may be the terminal in embodiments of this application, for example, a terminal and a vehicle in intelligent transportation, a household device in a smart household, an electricity meter reading instrument in a smart grid, a voltage monitoring instrument, an environment monitoring instrument, a video surveillance instrument in an intelligent security network, or a cash register.

For ease of understanding of embodiments of this application, related terms used in this specification are first briefly described.

1. Time Domain Unit

The time domain unit is a resource unit in a time-domain resource.

The time domain unit in embodiments of this application is a set of a plurality of consecutive orthogonal frequency division multiplexing (OFDM) symbols. For example, the time domain unit may be a minislot, a slot, a subframe, a transmission time interval (TTI), or the like.

In an NR communication system, for a normal cyclic prefix (CP), one slot includes 14 OFDM symbols. For an extended CP, one slot includes 12 OFDM symbols. In embodiments of this application, an example in which one slot includes 14 OFDM symbols is used for description.

In one slot, 14 OFDM symbols are sequentially numbered in ascending order, where a minimum number is 0, and a maximum number is 13. In embodiments of this application, an OFDM symbol whose index (namely, number) is i is denoted as an OFDM symbol #i. In this case, one slot includes an OFDM symbol #0 to an OFDM symbol #13.

The time domain unit may also be referred to as a time unit, a time domain granularity, or the like.

2. Time-Domain Resource Segment

The time-domain resource segment in embodiments of this application refers to a physical resource that includes a plurality of consecutive time domain units.

3. Frequency Domain Unit

The frequency domain unit is a resource unit in a frequency-domain resource. The frequency domain unit may be one or more PRBs. For example, the frequency domain unit may include x PRBs. x may be any positive integer. For example, x may be 1, 2, 4, 8, 16, or the like. The frequency domain unit may alternatively be one or more subcarriers. For example, the frequency domain unit may include y subcarriers. y may be any positive integer. For example, y may be 1, 12, 60, 120, or the like. The frequency domain unit may alternatively be a predefined subband, a band, a bandwidth part (BWP), a component carrier (CC), or the like.

4. Frequency-Domain Resource Segment

The frequency-domain resource segment in embodiments of this application refers to a physical resource that includes a plurality of consecutive frequency domain units.

5. Time-Frequency Resource Segment

The time-frequency resource segment in embodiments of this application refers to a physical resource that includes one time-domain resource segment and one frequency-domain resource segment.

6. Comb Structure

The comb structure may be used to indicate a distribution manner of signals or data on frequency-domain resources. The signals or data distributed based on the comb structure are evenly distributed on the frequency-domain resources at an equal interval. In other words, the signals or data distributed based on the comb structure are periodically distributed on the frequency-domain resources. A period of the signals or the data is a size of a comb, and may be denoted as K. A comb K indicates a comb structure with a period of K. K is an integer greater than or equal to 1.

Figure 3:
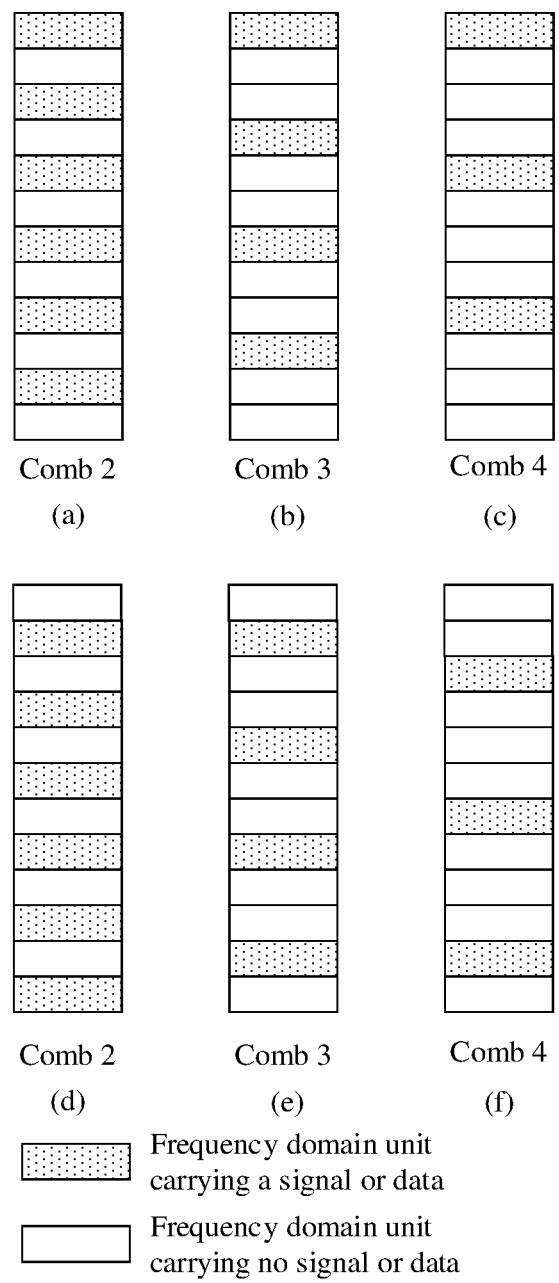
FIG. 3 is a schematic diagram of distribution of signals or data of comb structures in time-frequency resources.

For example, referring to FIG. 3, for distribution, on a frequency-domain resource, of signals or data distributed based on a comb 2, refer to (a) and (d) in FIG. 3; for distribution, on a frequency-domain resource, of signals or data distributed based on a comb 3, refer to (b) and (e) in FIG. 3; and for distribution, on a frequency-domain resource, of signals or data distributed based on a comb 4, refer to (c) and (f) in FIG. 3.

7. Measurement Bandwidth of the Terminal

The measurement bandwidth of the terminal refers to a bandwidth of the terminal for which channel measurement needs to be performed. The measurement bandwidth of the terminal may be a system bandwidth of the terminal, may be a BWP, or may be a transmission bandwidth of the terminal.

The system bandwidth refers to a bandwidth supported by the terminal or a bandwidth configured by the terminal, and may also be referred to as a carrier bandwidth. The BWP is a part of the system bandwidth. The transmission bandwidth refers to a bandwidth or a quantity of resources that may be used for data transmission and that are in the system bandwidth or in the BWP.

8. Antenna Port

The antenna port is a logical concept. One antenna port may correspond to one physical transmit antenna, or may correspond to a plurality of physical transmit antennas. In both the cases, a receiver of the terminal does not decompose a signal from a same antenna port. From a perspective of the terminal, regardless of whether a channel is formed by a single physical transmit antenna or combined by a plurality of physical transmit antennas, a reference signal (reference signal, RS) corresponding to this antenna port defines this antenna port, and the terminal may obtain a channel estimation of this antenna port based on this RS. One antenna port is one channel, and the terminal may perform channel estimation and data demodulation based on the reference signal corresponding to the antenna port.

Figure 4:
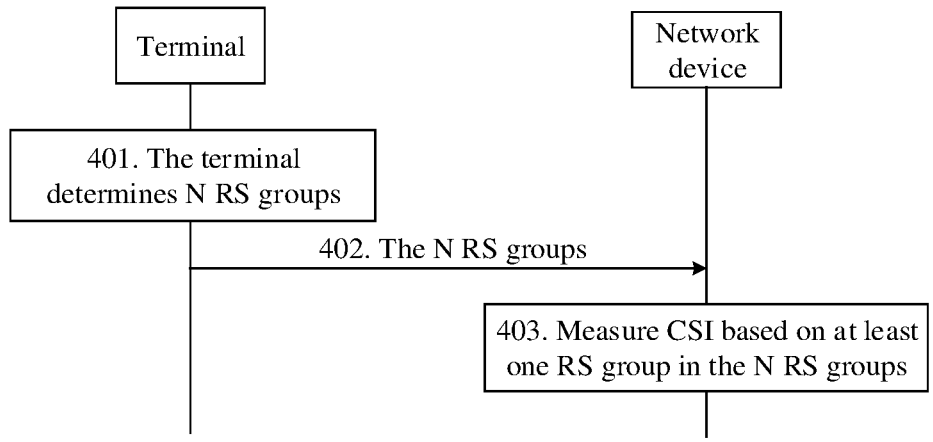
FIG. 4 is an interaction flowchart of a CSI measurement method according to an embodiment of this application.

An embodiment of this application provides a CSI measurement method. As shown in FIG. 4, the method includes the following steps.

401. A terminal determines N RS groups.

The N RS groups each include a first RS used to measure CSI and a second RS used to measure the CSI. Each of the first RS and the second RS in each RS group occupies one time-frequency resource segment. Frequency-domain resource segments occupied by different RS groups do not overlap, and time-domain resource segments occupied by different RS groups do not overlap. N is an integer greater than 1. For example, N is 2, 3, 4, or a larger integer.

The RSs that can be used to measure the CSI each may be used as the first RS or the second RS in this embodiment of this application. For example, the first RS may be an SRS, a Doppler tracking RS (DT-RS), or a channel tracking RS (CT-RS). The second RS may also be an SRS, a DT-RS, or a CT-RS. The DT-RS or the CT-RS may be an enhanced SRS. The DT-RS or the CT-RS herein is merely an example. The DT-RS or the CT-RS may alternatively be named another name, and may refer to another RS used to measure the CSI other than the SRS.

The first RS and the second RS may be used to measure uplink CSI. After uplink CSI is obtained by measurement, downlink CSI may be measured based on reciprocity of uplink and downlink channels. Therefore, it is also considered that the first RS and the second RS may be used to measure the downlink CSI.

Figure 5:
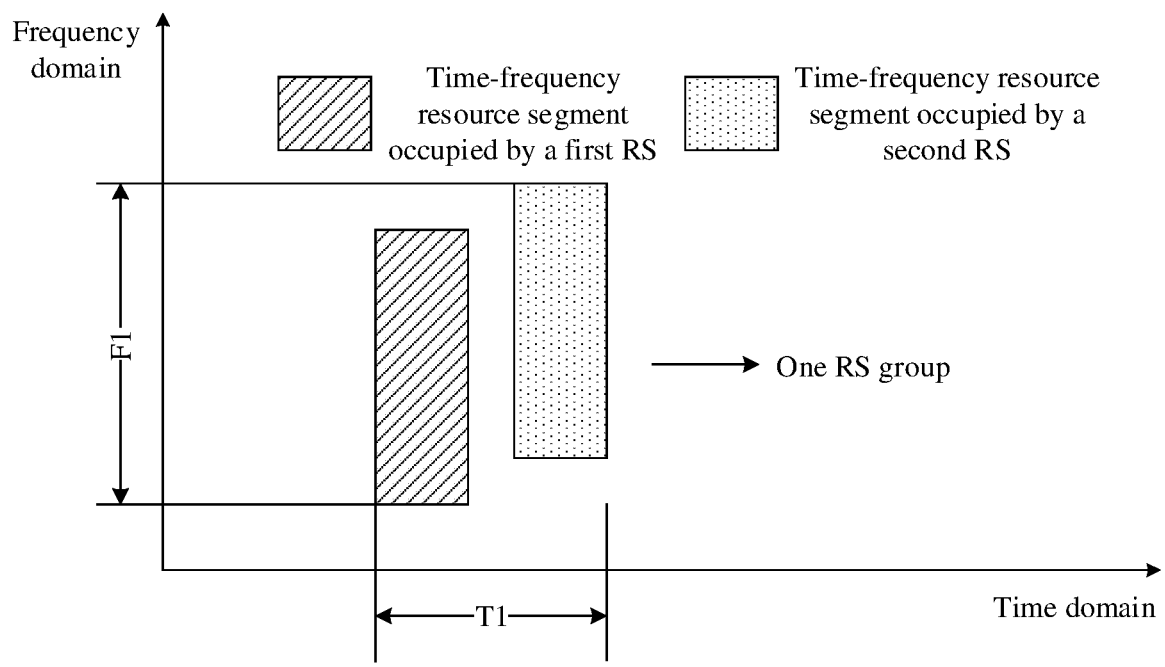

A frequency-domain resource segment occupied by one RS group is a segment of consecutive frequency-domain resources that includes frequency-domain resource segments occupied by all RSs in the RS group, and a time-domain resource segment occupied by one RS group is a segment of consecutive time-domain resources that includes time-domain resource segments occupied by all RSs in the RS group. For example, in FIG. 5, a frequency-domain resource segment occupied by one RS group may be F1 shown in the figure, and a time-domain resource segment occupied by one RS group may be T1 shown in the figure.

Figure 6A:
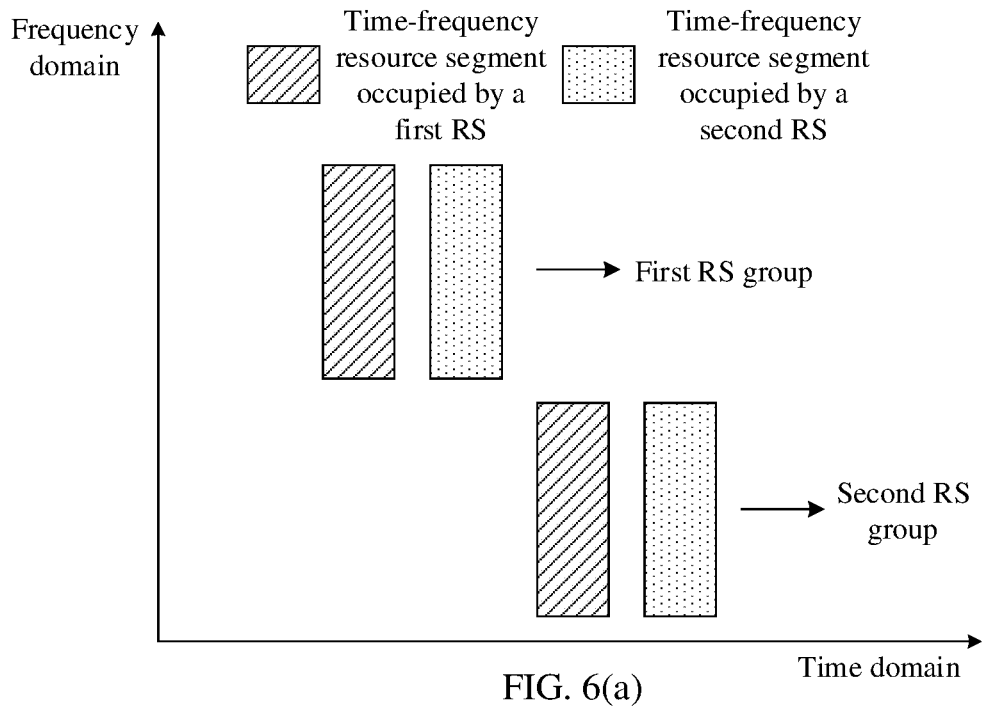
Figure 6B:
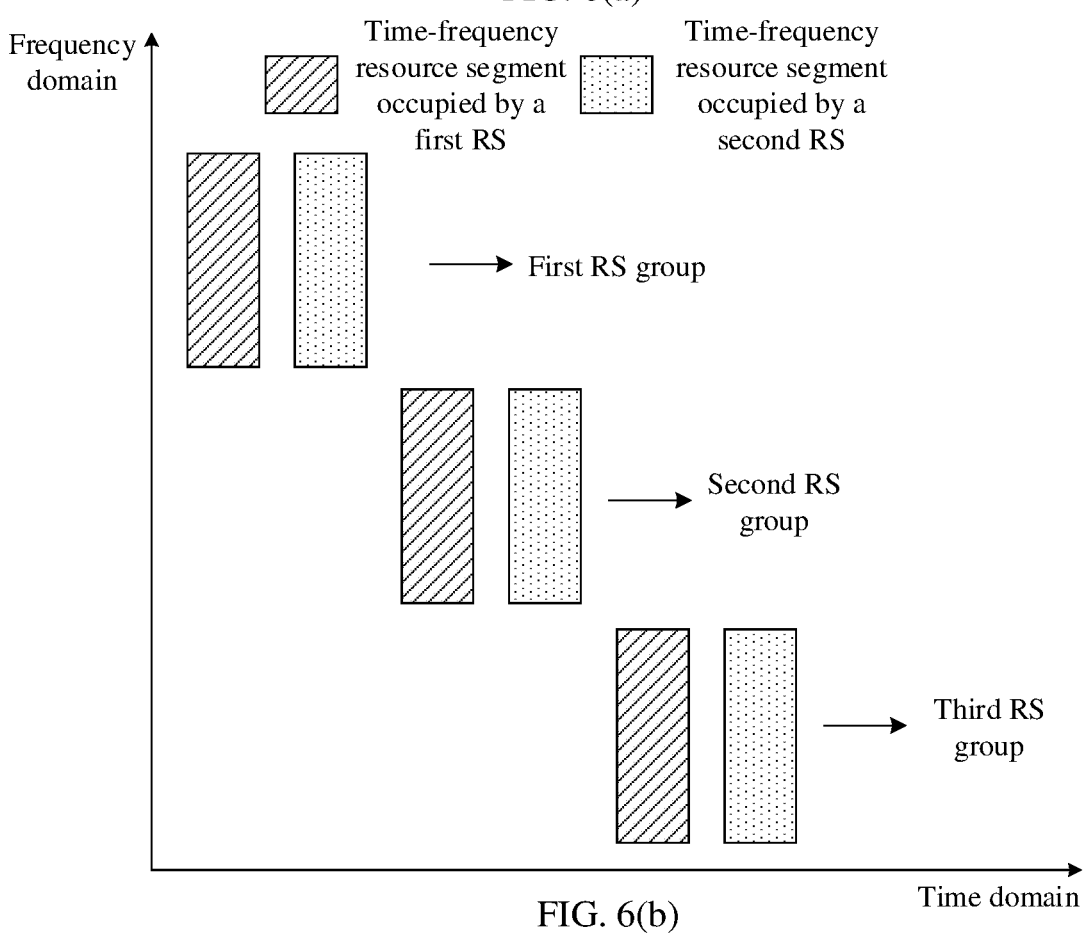

Frequency-domain resource segments occupied by different RS groups may not overlap, and time-domain resource segments occupied by different RS groups may not overlap. For example, if N=2, time-frequency resource segments occupied by two RS groups can be seen in FIG. 6(a); or if N=3, time-frequency resource segments occupied by three RS groups can be seen in FIG. 6(b). In this optional method, CSI measurement may be performed on a frequency-domain resource segment occupied by one RS group by using a first RS and a second RS in the RS group. It may be understood that this application relates to frequency hopping of an RS. A time-frequency resource segment occupied by one RS group may be considered as one frequency hopping location. In FIG. 6(a), there are two frequency hopping locations, and in FIG. 6(b), there are three frequency hopping locations.

Optionally, a first RS and a second RS in each RS group occupy a same frequency-domain resource segment. In this case, a frequency-domain resource segment occupied by one RS group is a frequency-domain resource segment occupied by a first RS or a second RS.

Figure 7A:
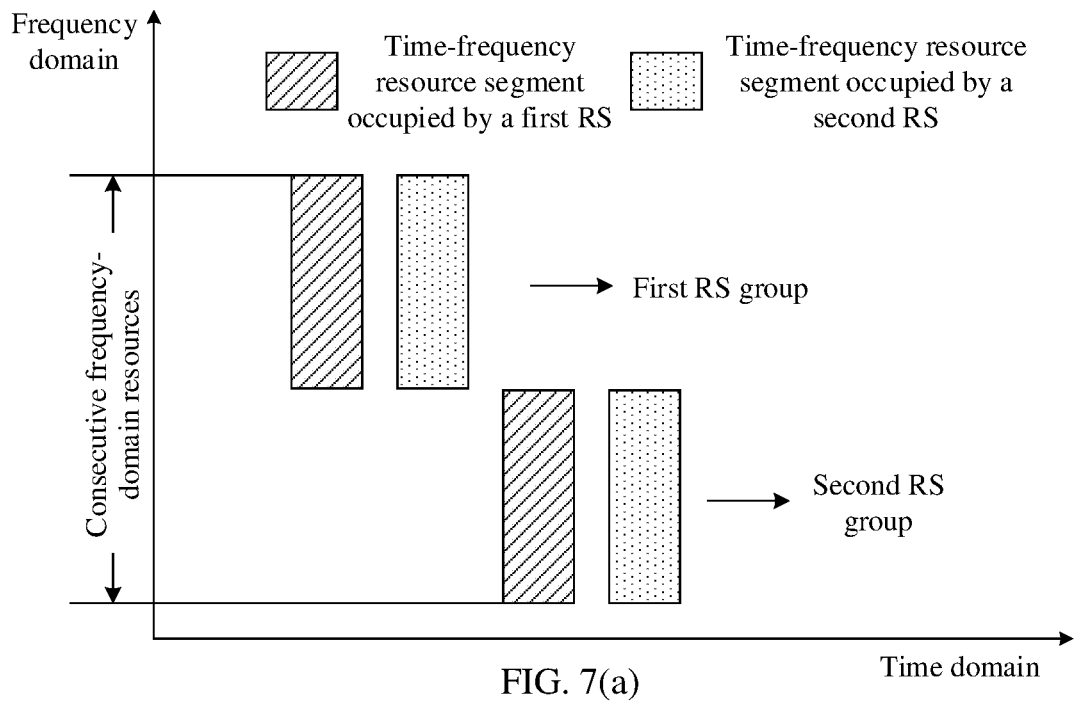
Figure 7B:
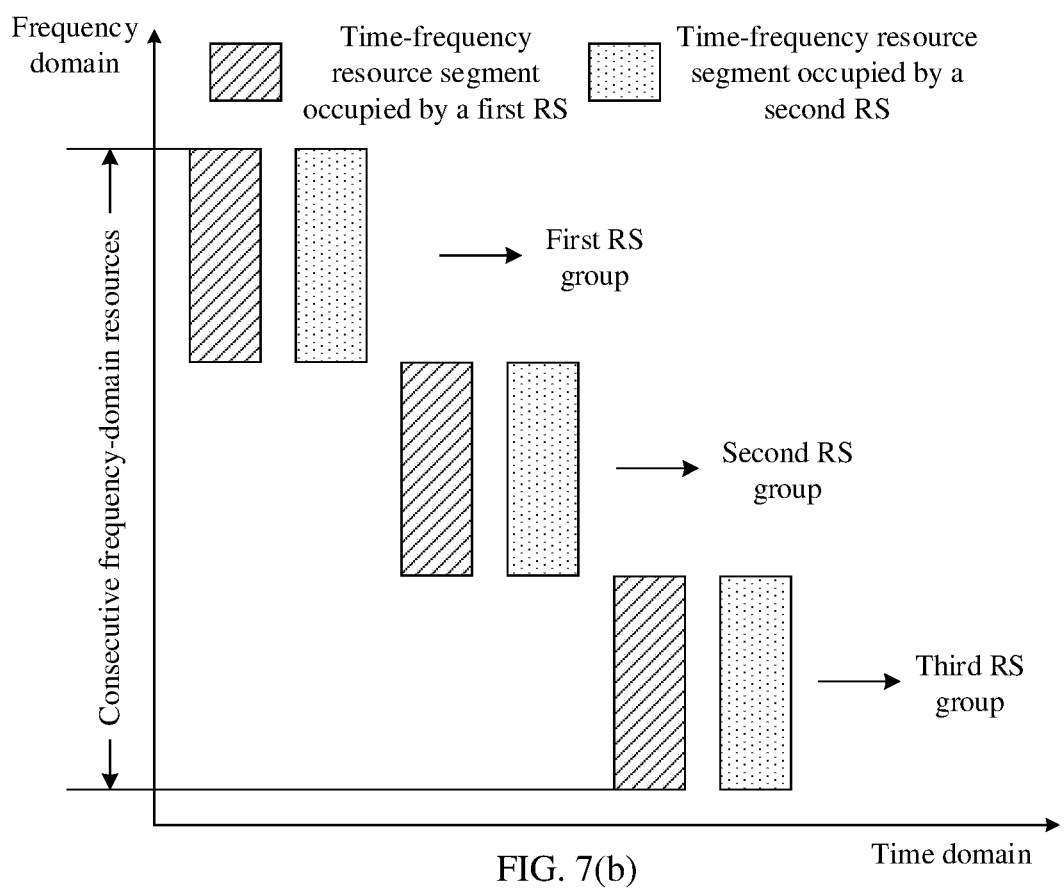

Optionally, frequency-domain resource segments occupied by N RS groups form a segment of consecutive frequency-domain resources. For example, if N=2, time-frequency resource segments occupied by two RS groups form a segment of consecutive frequency-domain resources, as shown in FIG. 7(a). If N=3, time-frequency resource segments occupied by three RS groups form a segment of consecutive frequency-domain resources, as shown in FIG. 7(b). In this optional method, CSI measurement may be performed on a segment of consecutive frequency-domain resources by using the N RS groups.

Optionally, the consecutive frequency-domain resources formed by the frequency-domain resource segments occupied by the N RS groups are a measurement bandwidth of the terminal. In this optional method, CSI measurement may be performed on the entire measurement bandwidth of the terminal by using the N RS groups.

It should be noted that a first RS and a second RS are essentially a sequence, for example, a ZC (Zadoff Chu) sequence, a sequence obtained by modulating a gold sequence, or a sequence obtained after the sequence obtained by modulating the gold sequence is subject to another operation (for example, discrete Fourier transform (DFT)). One sequence may include a plurality of elements. For example, each element may be a complex symbol. One or more elements are carried on one resource element (RE). In this embodiment of this application, that the first RS occupies a time-frequency resource segment does not mean that the first RS occupies all REs in the time-frequency resource segment, but means that the first RS is carried on some REs (which may be all or some of the REs) on the time-frequency resource segment. For example, if the time-frequency resource segment occupied by the first RS includes 168 REs, the first RS may occupy nine REs thereof. This rule also applies to the second RS.

Optionally, an antenna port of the terminal corresponding to an RS port included in the second RS is at least partially the same as an antenna port of the terminal corresponding to an RS port included in the first RS. In this optional method, the first RS and the second RS can be combined to measure the CSI.

At least some of the antenna ports that are of the terminal and that correspond to the RS ports included in the second RS are the same as the antenna ports that are of the terminal and that correspond to the RS ports included in the first RS. To be specific, some of the antenna ports that are of the terminal and that correspond to the RS ports included in the second RS are the same as the antenna ports that are of the terminal and that correspond to the RS ports included in the first RS (which is denoted as an example 1); or all of the antenna ports that are of the terminal and that correspond to the RS ports included in the second RS are the same as the antenna ports that are of the terminal and that correspond to the RS ports included in the first RS (which is denoted as an example 2).

Example 1 specifically refers to a one-to-one correspondence between at least one RS port included in the second RS and at least one RS port included in the first RS. Example 2 specifically refers to a one-to-one correspondence between all RS ports included in the second RS and all RS ports included in the first RS. Two RS ports that have a correspondence are corresponding to a same antenna port of the terminal.

402. The terminal sends the N RS groups to a network device. Accordingly, the network device receives the N RS groups sent by the terminal.

403. The network device measures CSI based on at least one RS group in the N RS groups.

When step 403 is specifically implemented, the network device may measure the CSI based on each RS group. For one RS group, the network device may measure uplink CSI based on a first RS, or may measure uplink CSI based on a second RS, and further, may measure downlink CSI based on reciprocity of uplink and downlink channels. A specific method is familiar to a person skilled in the art, and details are not described herein.

When step 403 is specifically implemented, the network device may alternatively perform joint measurement on the uplink CSI based on the first RS and the second RS, and further, may measure the downlink CSI based on reciprocity of uplink and downlink channels.

If the network device performs joint measurement on the uplink CSI based on the first RS and the second RS, the network device may perform joint measurement based on the first RS and the second RS to obtain uplink CSI when the network device sends a PUSCH, or may perform joint measurement to obtain downlink CSI when a PDSCH is sent. For example, for an RS group, when step 403 is specifically implemented, step 403 may include: The network device performs joint measurement based on a first RS and a second RS in the RS group to obtain downlink CSI when the network device sends the PDSCH.

In a first possible implementation, a joint measurement process may include: The network device calculates uplink CSI1 based on a first RS in one RS group, and calculates downlink CSI1 based on the uplink CSI1; the network device calculates uplink CSI2 based on a second RS in the RS group, and calculates downlink CSI2 based on the uplink CSI2; and the network device performs machine learning or linear/non-linear prediction based on the downlink CSI1 and the downlink CSI2 to obtain the downlink CSI when the network device sends the PDSCH.

In a second possible implementation, a joint measurement process may include: The network device calculates uplink CSI1 based on a first RS in one RS group, and calculates downlink CSI1 based on the uplink CSI1; the network device calculates uplink CSI2 based on a second RS in the RS group, and calculates downlink CSI2 based on the uplink CSI2; the network device calculates, by using an interpolation algorithm, one or more pieces of uplink CSI corresponding to one or more time-domain resource segments between a time-domain resource segment occupied by the first RS and a time-domain resource segment occupied by the second RS, and calculates corresponding downlink CSI based on the one or more pieces of uplink CSI; and the network device performs machine learning or linear/non-linear prediction based on all the calculated downlink CSI to obtain the downlink CSI when the network device sends the PDSCH.

In a third possible implementation, a joint measurement process may include: The network device calculates uplink CSI1 based on a first RS in one RS group, and calculates downlink CSI1 based on the uplink CSI1; the network device calculates uplink CSI2 based on a second RS in the RS group, and calculates downlink CSI2 based on the uplink CSI2; and the network device averages the downlink CSI1 and the downlink CSI2 to obtain the downlink CSI when the network device sends the PDSCH.

Optionally, which RS in the RS group is used by the network device to measure the CSI may be predefined, pre-configured, or stipulated in a protocol, may be configured by the network device, or may be determined through negotiation between the network device and the terminal.

According to the method provided in this embodiment of this application, the network device may obtain, through joint measurement that is based on the first RS and the second RS, the downlink CSI that exists when the PDSCH is sent, to obtain instantaneous CSI of the terminal in a scenario in which the terminal moves. Then, the network device determines a precoding matrix that better matches the current downlink CSI, and precodes, based on the precoding matrix, the PDSCH sent to the terminal, to avoid channel aging and improve receiving quality of receiving the PDSCH by the terminal. In a frequency hopping case, distribution of first RSs and second RSs on physical resources proposed in this application enables RSs in a same RS group to be used for joint measurement, to improve accuracy of CSI estimation and prediction, and further increase a downlink throughput.

In a first possible implementation, the first RSs are periodically distributed in time domain.

A time domain period of the first RSs may be one or more time domain units. For example, the time domain period may be one or more slots or one or more subframes. The time domain period of the first RSs may be predefined, pre-configured, or stipulated in a protocol, may be configured by the network device, or may be determined through negotiation between the network device and the terminal.

Figure 8:
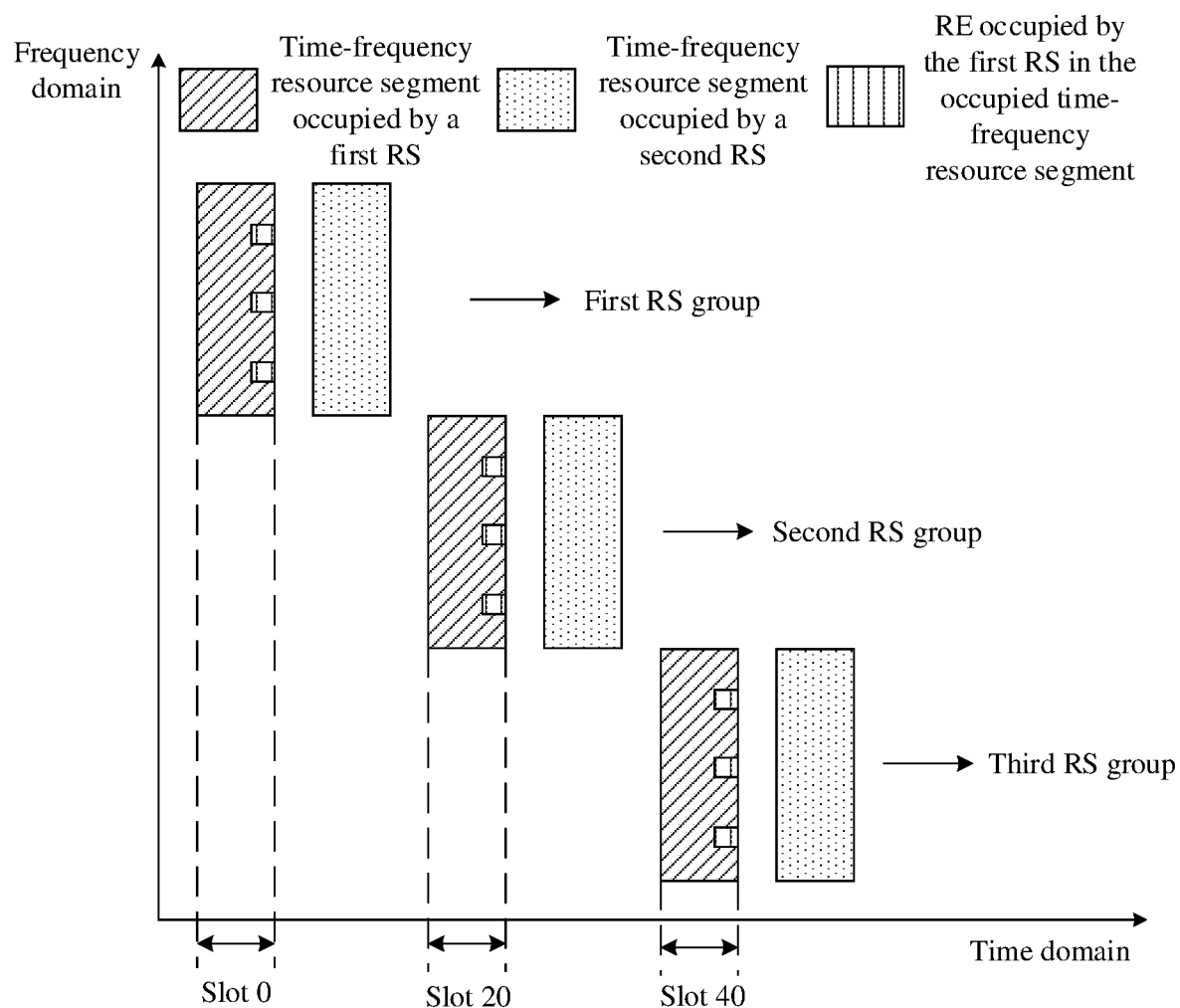
FIG. 8 is a schematic diagram of distribution of first RSs in time-frequency resource segments according to an embodiment of this application.

For example, referring to FIG. 8, a first RS in the first RS group is carried in a slot 0, a first RS in the second RS group is carried in a slot 20, and a first RS in the third RS group is carried in a slot 40, so that the time domain period of the first RSs is 20 slots.

In a second possible implementation, the second RSs are periodically distributed in time domain.

A time domain period of the second RSs may be one or more time domain units. For example, the time domain period may be one or more slots or one or more subframes. The time domain period of the first RSs and the time domain period of the second RSs may be the same or different, which is not limited in this application. When the periods of the second RSs and the first RSs are the same, the network device may use CSI prior information measured by using the first RS when the second RS is used to measure the CSI. In this case, a quantity of REs occupied by the second RS may be reduced, to reduce pilot overheads of the second RS.

The time domain period of the second RSs may be predefined, pre-configured, or stipulated in a protocol, may be configured by the network device or determined through negotiation between the network device and the terminal, or may be the time domain period of the first RSs (that is, the time domain period of the second RSs is the same as the time domain period of the first RSs).

Figure 9:
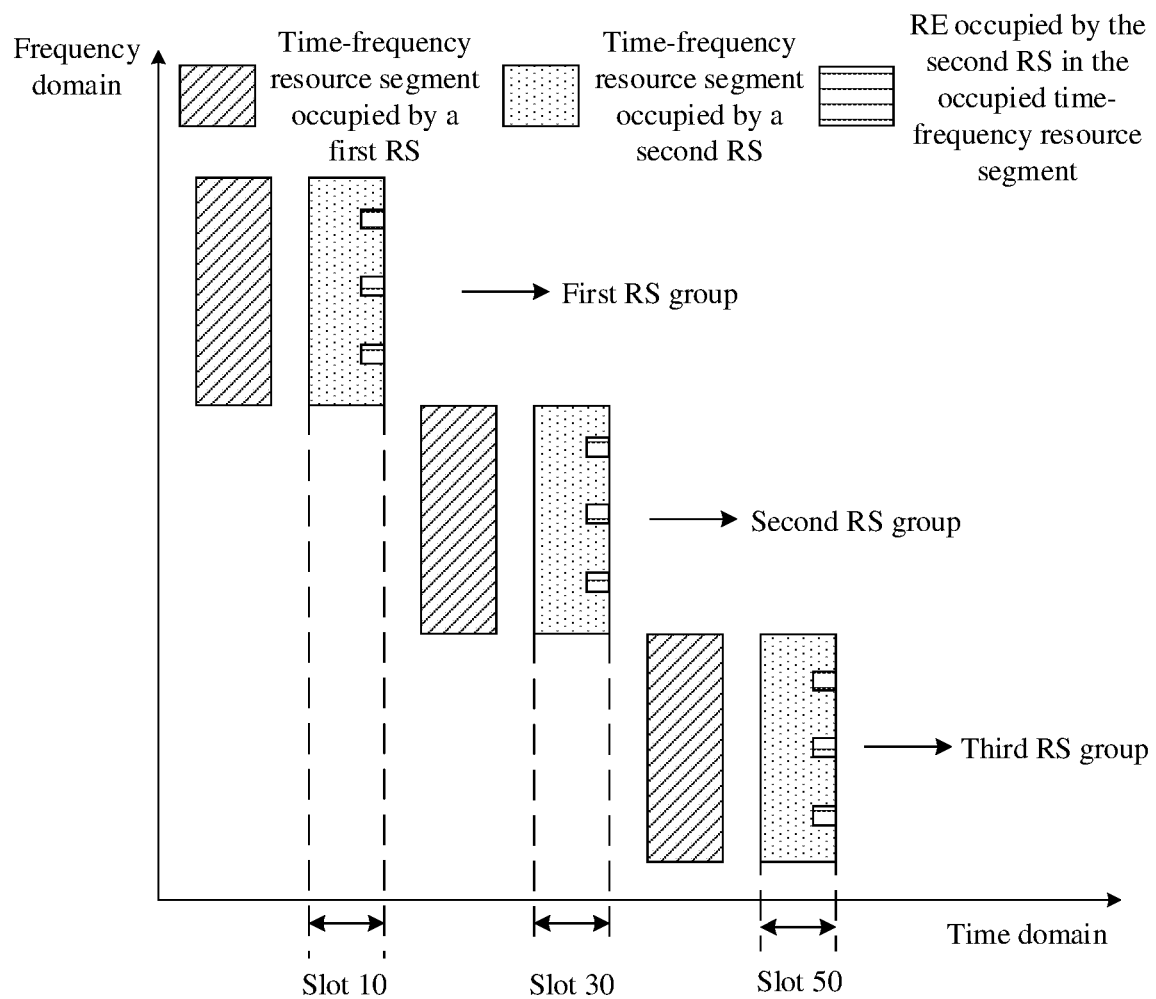
FIG. 9 is a schematic diagram of distribution of second RSs in time-frequency resource segments according to an embodiment of this application.

For example, referring to FIG. 9, a second RS in the first RS group is carried in a slot 10, a second RS in the second RS group is carried in a slot 30, and a second RS in the third RS group is carried in a slot 50, so that the time domain period of the second RSs is 20 slots.

In a third possible implementation, RS groups are periodically distributed in time domain.

A time domain period of the RS groups may be one or more time domain units. For example, the time domain period may be one or more slots or one or more subframes. The time domain period of the RS groups may be predefined, pre-configured, or stipulated in a protocol, may be configured by the network device, or may be determined through negotiation between the network device and the terminal.

Figure 10:
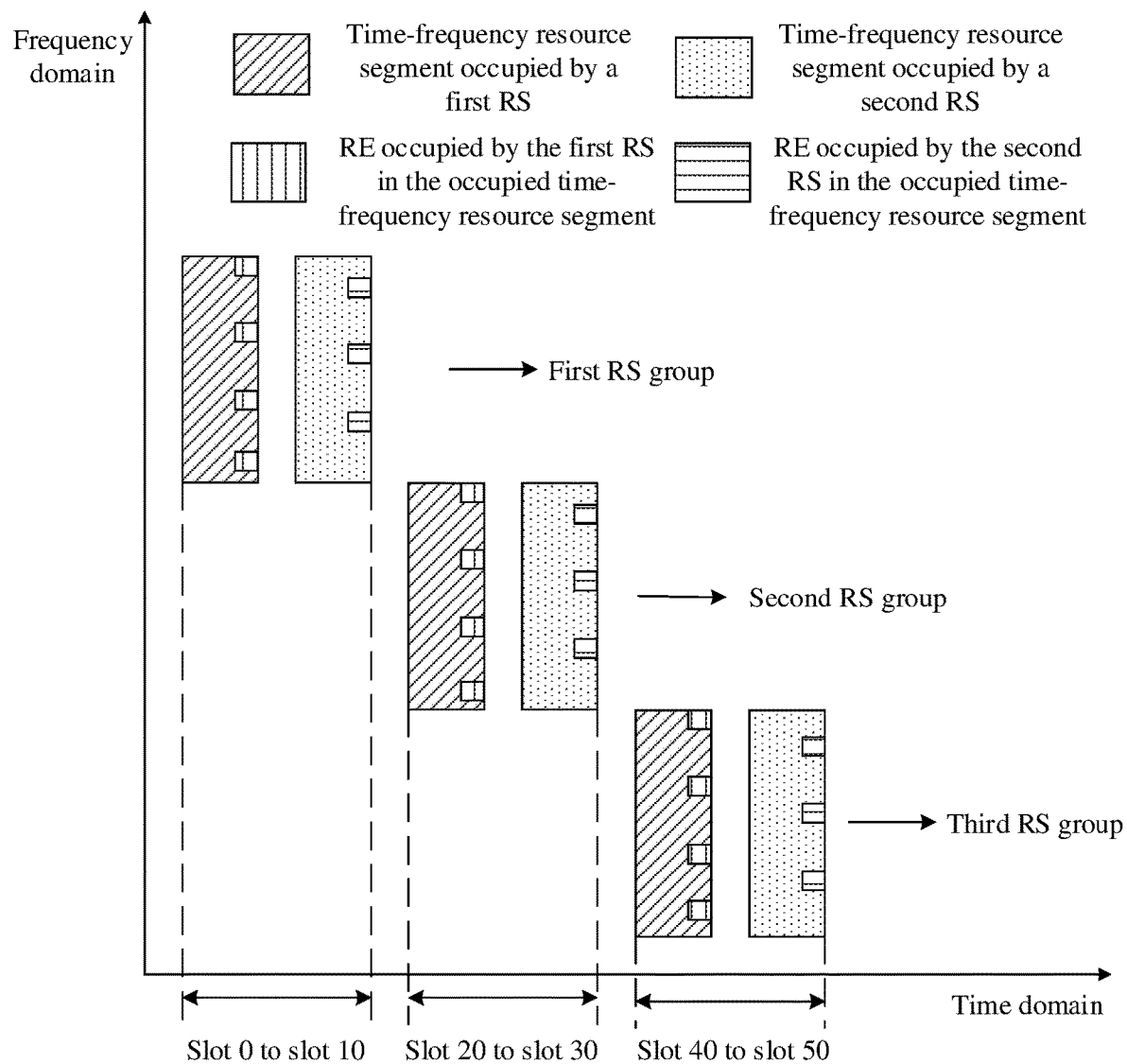
FIG. 10 is a schematic diagram of time-domain resource segments occupied by time-frequency resource segments according to an embodiment of this application.

For example, referring to FIG. 10, the first RS group is carried between a slot 0 and a slot 10, the second RS group is carried between a slot 20 and a slot 30, and the third RS group is carried between a slot 40 and a slot 50, so that the time domain period of the RS groups is 20 slots.

In a fourth possible implementation, a location of a first RS in each RS group in an occupied time-frequency resource segment is different from that of a second RS in the occupied time-frequency resource segment.

The fourth possible implementation may include the following two cases: (1) In the RS group, a quantity of REs occupied by the first RS in the occupied time-frequency resource segment is different from that of REs occupied by the second RS in the occupied time-frequency resource segment; and (2) in the RS group, the quantity of REs occupied by the first RS in the occupied time-frequency resource segment is the same as the quantity of REs occupied by the second RS in the occupied time-frequency resource segment, but locations of REs occupied by the first RS in the occupied time-frequency resource segment are different from locations of REs occupied by the second RS in the occupied time-frequency resource segment.

Figure 11A:
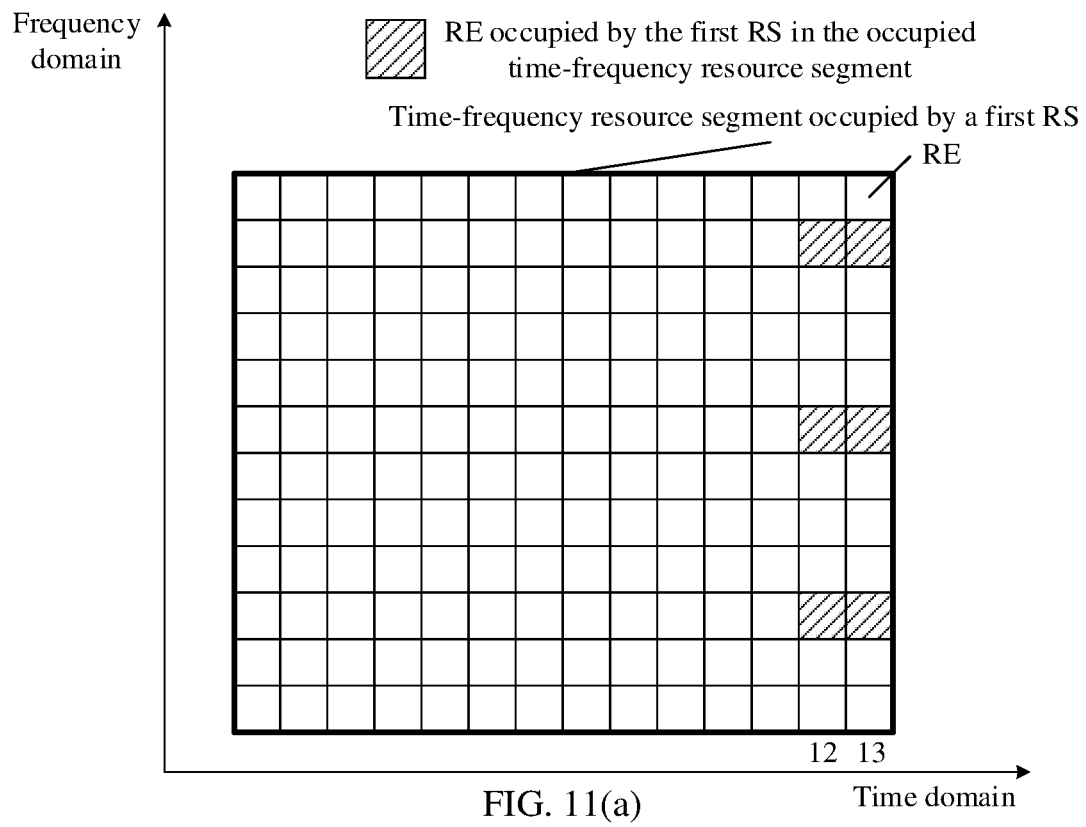
Figure 11B:
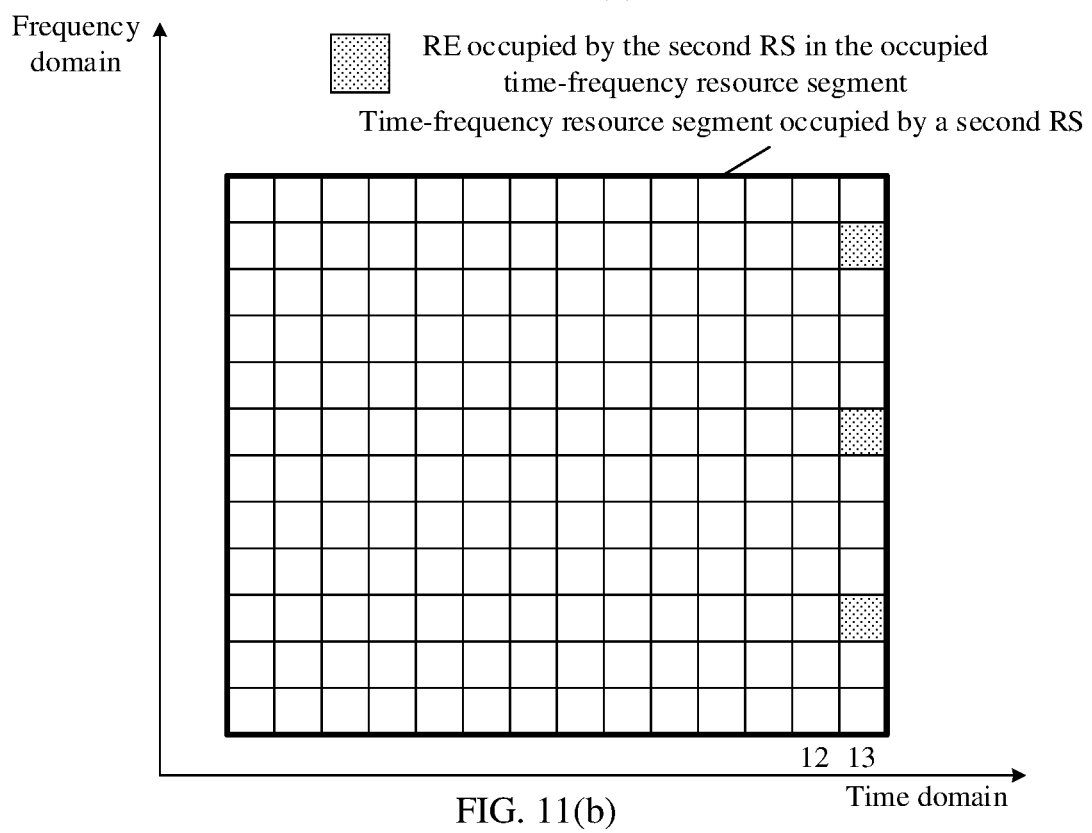

For example, for one RS group, referring to FIG. 11(a), a first RS occupies six REs in an occupied time-frequency resource segment, and referring to FIG. 11(b), a second RS occupies three REs in the occupied time-frequency resource segment. In this case, in the RS group, a quantity of REs occupied by the first RS in the occupied time-frequency resource segment and a quantity of REs occupied by the second RS in the occupied time-frequency resource segment are different, that is, a location of the first RS in the occupied time-frequency resource segment is different from that of the second RS in the occupied time-frequency resource segment.

Figure 12A:
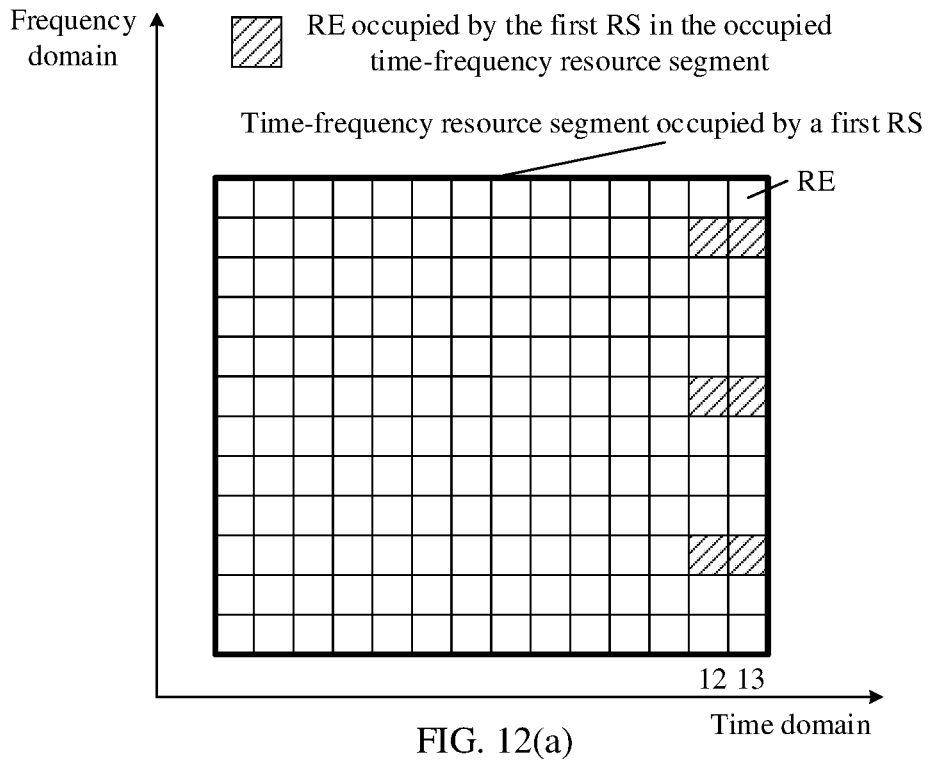
Figure 12B:
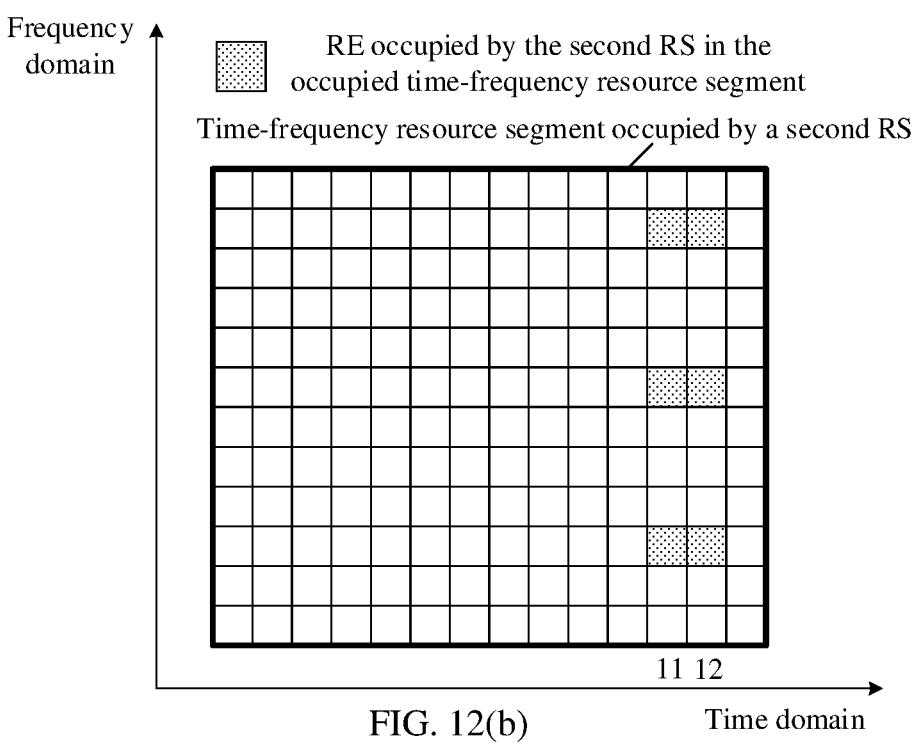

For example, for one RS group, referring to FIG. 12(a), a first RS occupies six REs in an occupied time-frequency resource segment, and referring to FIG. 12(b), a second RS also occupies six REs in the occupied time-frequency resource segment. However, locations of the six REs occupied by the first RS are different from locations of the six REs occupied by the second RS.

In the fourth possible implementation, optionally, in the RS group, the quantity of REs occupied by the second RS in the occupied time-frequency resource segment is less than the quantity of REs occupied by the first RS in the occupied time-frequency resource segment. In this optional method, pilot overheads may be reduced compared with a case in which in the RS group, the quantity of REs occupied by the second RS in the occupied time-frequency resource segment is the same as the quantity of REs occupied by the first RS in the occupied time-frequency resource segment. For example, referring to FIG. 10, in each RS group, a quantity of REs occupied by a first RS in an occupied time-frequency resource segment is greater than a quantity of REs occupied by a second RS in the occupied time-frequency resource segment.

In a fifth possible implementation, a first RS and a second RS in each RS group use same comb structures in frequency domain (that is, comb sizes are the same), or the first RS and the second RS in each RS group use different comb structures in frequency domain (that is, comb sizes are different).

If the first RS and the second RS in each RS group use the same comb structures in frequency domain, in one RS group, if a comb structure used by a first RS in frequency domain is comb 2, a comb structure used by a second RS in frequency domain is also comb 2, and if the comb structure used by the first RS in frequency domain is comb 3, the comb structure used by the second RS in frequency domain is also comb 3. For example, referring to FIG. 11(*a*) and FIG. 11(*b*), comb structures used by a first RS and a second RS in frequency domain are both combo.

Comb structures used by the first RS and the second RS in each RS group in frequency domain may be different. For example, in one RS group, if a comb structure used by a first RS in frequency domain is comb 2, a comb structure used by a second RS in frequency domain is not comb 2 and may be comb 3 or comb 4. For example, in one RS group, referring to FIG. 13(*a*), a comb structure used by a first RS in frequency domain is comb 3, and referring to FIG. 13(*b*), a comb structure used by a second RS in frequency domain is comb 4.

In the fifth possible implementation, optionally, distribution of second RSs in frequency domain is sparser than distribution of first RSs in frequency domain. That is, a comb size of the comb structure used by the second RS is greater than a comb size of the comb structure used by the first RS. For example, referring to FIG. 13(*b*), the comb size of the comb structure used by the second RS in frequency domain is 4, and referring to FIG. 13(*a*), the comb size of the comb structure used by the first RS is 3, that is, the comb size of the comb structure used by the second RS in frequency domain is greater than the comb size of the comb structure used by the first RS. Compared with a case in which the first RS and the second RS use a same comb structure in frequency domain, pilot overheads can be reduced by using the optional method.

In the fifth possible implementation, the CSI prior information measured by the first RS can be effectively used when the second RS is used to measure the CSI. In this case, a size of the comb structure used by the second RS may be larger than that of the comb structure used by the first RS, to effectively reduce the pilot overheads of the second RS.

In a sixth possible implementation, start locations of the first RS and the second RS in each RS group in frequency domain are the same, or start locations of the first RS and the second RS in each RS group in frequency domain are different.

A start location of one RS in frequency domain may have the following two cases:
1. A start location of one RS in frequency domain may be a subcarrier, in a time-frequency resource segment, with a smallest index in subcarriers corresponding to REs occupied by the RS.
2. A start location of one RS in frequency domain may be a subcarrier, in a time-frequency resource segment, with a largest index in subcarriers corresponding to REs occupied by the RS.

Figure 14A:
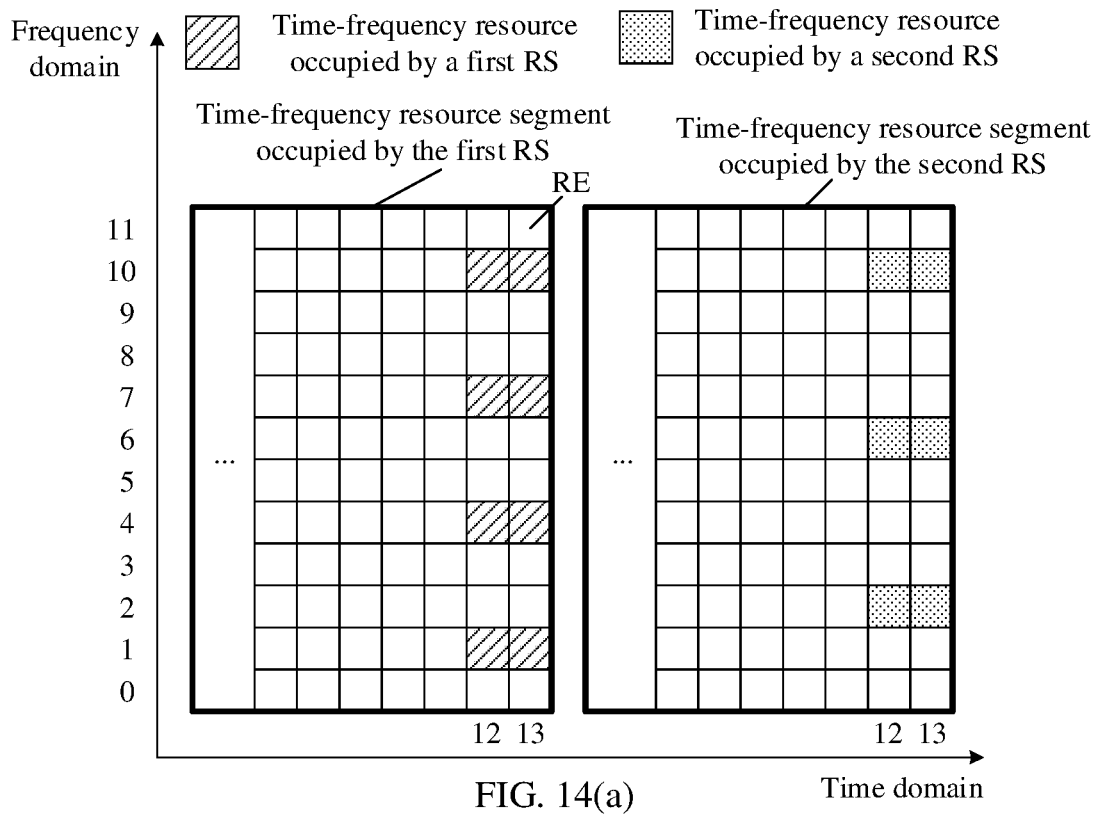
Figure 14B:
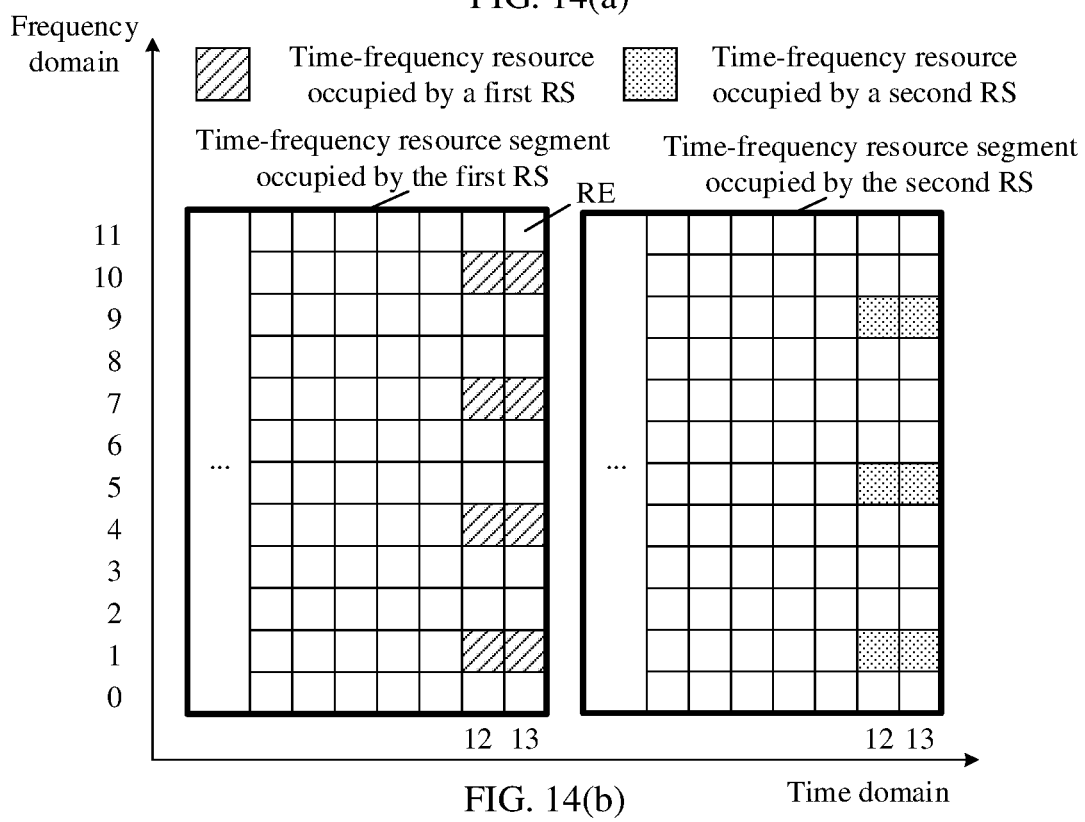

The first case of a start location of one RS in frequency domain is used as an example. Referring to FIG. 14(*a*), a start location of a first RS in frequency domain is a subcarrier 1, and a start location of a second RS in frequency domain is a subcarrier 2. Therefore, the start locations of the first RS and the second RS in frequency domain are different. Referring to FIG. 14(*b*), a start location of a first RS in frequency domain is a subcarrier 1, and a start location of a second RS in frequency domain is also the subcarrier 1. Therefore, the start locations of the first RS and the second RS in frequency domain are the same.

In the sixth possible implementation, end locations may alternatively be used to measure whether locations of the first RS and the second RS are the same in frequency domain. Principles are similar, and details are not described.

In a seventh possible implementation, in a time-frequency resource segment occupied by each RS, OFDM symbols carrying the RS are the same; or in a time-frequency resource segment occupied by each RS, OFDM symbols carrying the RS are different.

In the seventh possible implementation, that the OFDM symbols are the same indicates that quantities of OFDM symbols and locations of the OFDM symbols are the same. That the OFDM symbols are different indicates that the quantities of OFDM symbols are different, or the quantities of OFDM symbols are the same but the locations of OFDM symbols are different.

For example, referring to FIG. 14(*a*) or FIG. 14(*b*), in a time-frequency resource segment occupied by the first RS, OFDM symbols that carry the first RS are an OFDM symbol 12 and an OFDM symbol 13, and in a time-frequency resource segment occupied by the second RS, OFDM symbols that carry the second RS are also an OFDM symbol 12 and an OFDM symbol 13. Therefore, in the time-frequency resource segments, the OFDM symbols that carry the first RS are the same as the OFDM symbols that carry the second RS.

For example, referring to FIG. 11(*a*), in a time-frequency resource segment occupied by the first RS, OFDM symbols that carry the first RS are an OFDM symbol 12 and an OFDM symbol 13, and referring to FIG. 11(*b*), in a time-frequency resource segment occupied by the second RS, an OFDM symbol that carries the second RS is an OFDM symbol 13. Therefore, in the time-frequency resource segments, a quantity of OFDM symbols that carry the first RS is different from a quantity of OFDM symbols that carry the second RS, and then the OFDM symbols that carry the first RS and the OFDM symbol that carries the second RS are considered to be different.

Figure 13A:
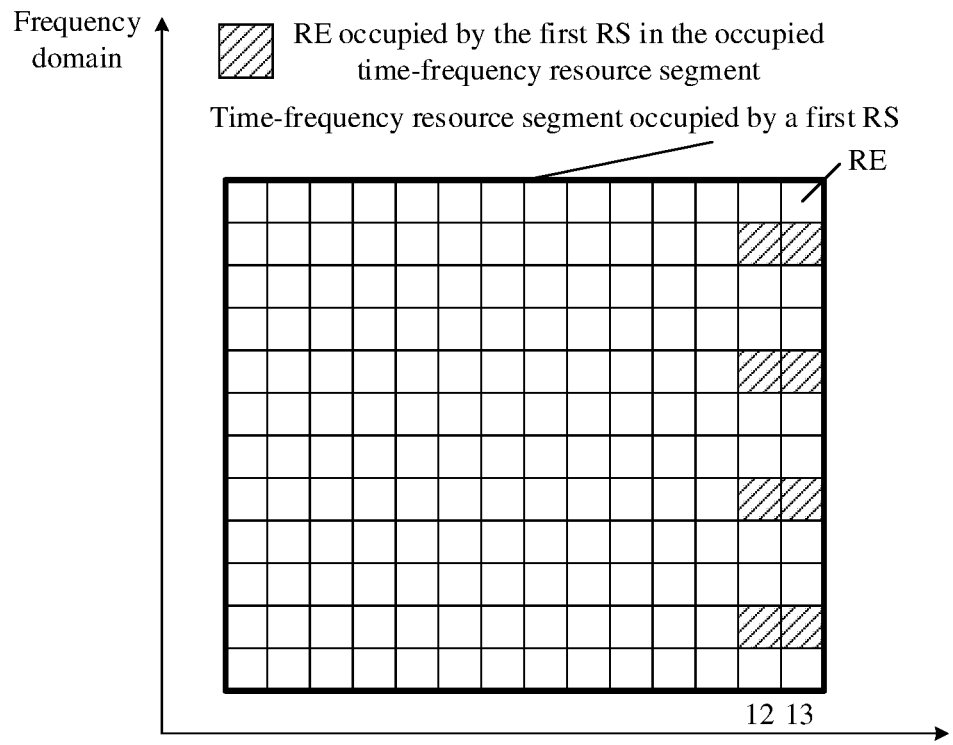
Figure 13B:
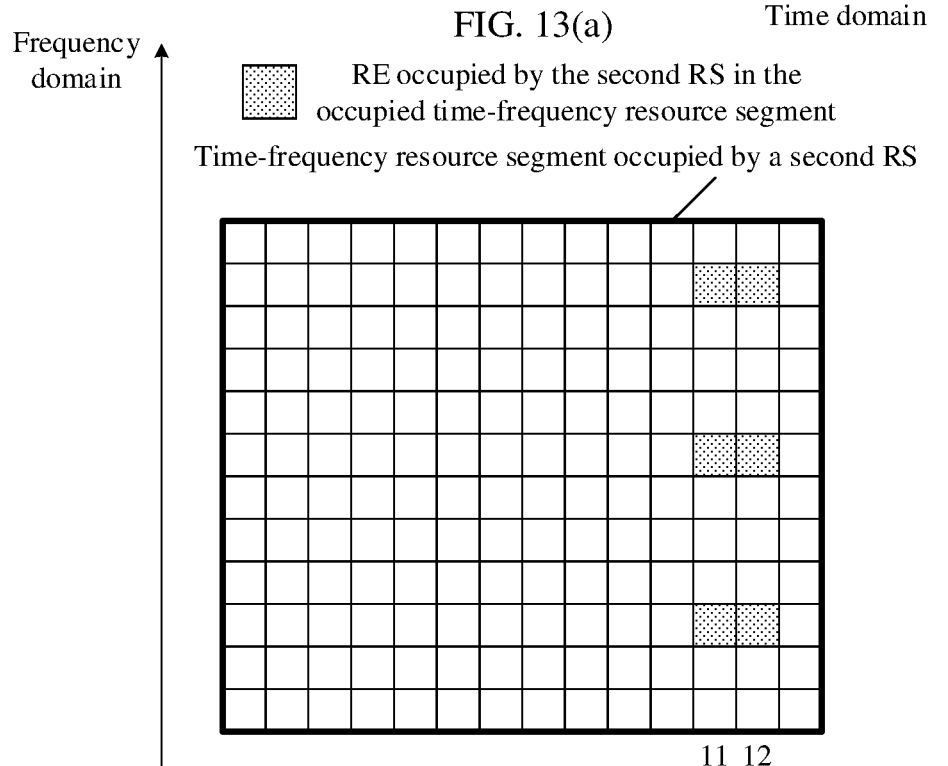

For example, referring to FIG. 13(*a*), in a time-frequency resource segment occupied by the first RS, OFDM symbols that carry the first RS are an OFDM symbol 12 and an OFDM symbol 13, and referring to FIG. 13(*b*), in a time-frequency resource segment occupied by the second RS, OFDM symbols that carry the second RS are an OFDM symbol 11 and an OFDM symbol 12. Therefore, in the time-frequency resource segments, the OFDM symbols that carry the first RS and the OFDM symbols that carry the second RS are the same in quantity, but different in location, and then the OFDM symbols that carry the first RS and the OFDM symbols that carry the second RS are considered to be different.

In an eighth possible implementation, each RS is distributed in some or all PRBs in a frequency-domain resource segment occupied by the RS.

In a same RS group, a first RS and a second RS each may be distributed in some PRBs in a frequency-domain resource segment occupied by the first RS or the second RS; the first RS and the second RS each may be distributed in all PRBs in the frequency-domain resource segment occupied by the first RS or the second RS; or one RS of the first RS and the second RS may be distributed in some PRBs in the frequency-domain resource segment occupied by the RS, and the other RS of the first RS and the second RS may be distributed in all PRBs in the frequency-domain resource segment occupied by the other RS.

For example, referring to FIG. 15(a) and FIG. 15(b), a first RS is distributed in some PRBs in a frequency-domain resource segment occupied by the first RS, and a second RS is distributed in some PRBs in a frequency-domain resource segment occupied by the second RS. It should be noted that the PRBs occupied by the first RS in the frequency-domain resource segment occupied by the first RS and the PRBs occupied by the second RS in the frequency-domain resource segments occupied by the second RS may be the same, or may be different (quantities of PRBs are different, or quantities of PRBs are the same, but locations of the PRBs are different). For example, if four PRBs from top to bottom in FIG. 15(a) and FIG. 15(b) are respectively denoted as PRB1, PRB2, PRB3, and PRB4, in FIG. 15(a), the PRBs occupied by the first RS are PRB1 and PRB3, and the PRBs occupied by the second RS are PRB2 and PRB4. In this case, the PRBs occupied by the first RS in the frequency-domain resource segment occupied by the first RS and the PRBs occupied by the second RS in the frequency-domain resource segments occupied by the second RS are different. In FIG. 15(b), the PRBs occupied by both the first RS and the second RS are PRB1 and PRB3. In this case, the PRBs occupied by the first RS in the frequency-domain resource segment occupied by the first RS and the PRBs occupied by the second RS in the frequency-domain resource segments occupied by the second RS are the same.

Figures 16A, 16B:
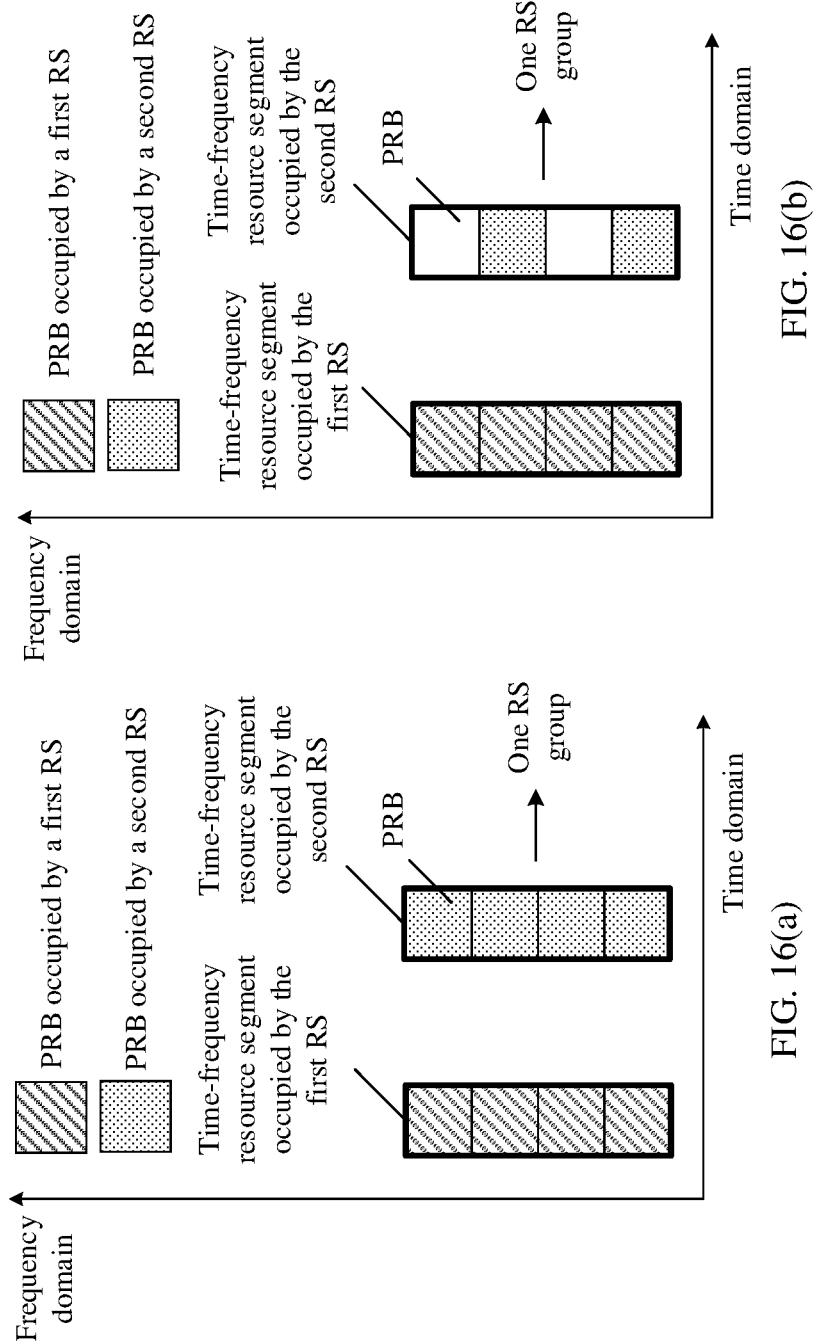

For example, referring to FIG. 16(a), a first RS is distributed in all PRBs in a frequency-domain resource segment occupied by the first RS, and a second RS is distributed in all PRBs in a frequency-domain resource segment occupied by the second RS. Referring to FIG. 16(b), a first RS is distributed in all PRBs in a frequency-domain resource segment occupied by the first RS, and a second RS is distributed in some PRBs in a frequency-domain resource segment occupied by the second RS.

In the eighth possible implementation, optionally, in a time-frequency resource segment occupied by each RS, on each PRB carrying the RS, OFDM symbols occupied by the RS are the same; or in a time-frequency resource segment occupied by each RS, on at least two PRBs carrying the RS, OFDM symbols occupied by the RS are different.

Figure 17:
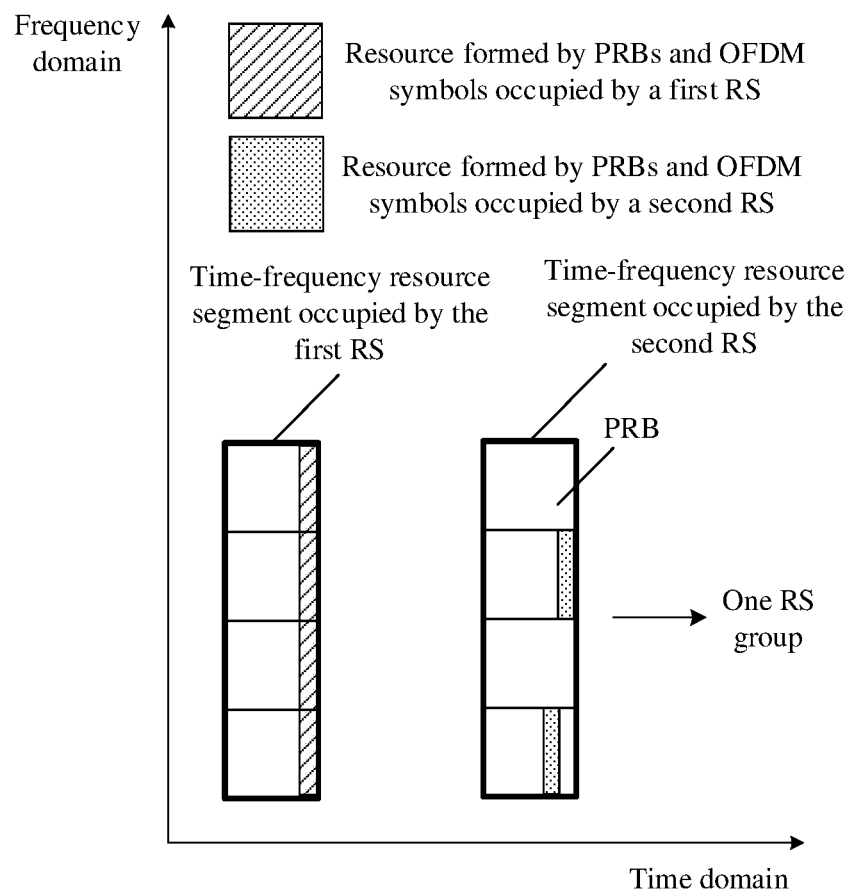
FIG. 17 is a schematic diagram of PRBs and OFDM symbols occupied by a first RS and a second RS in time-frequency resource segments according to an embodiment of this application.

For example, based on FIG. 16(b), referring to FIG. 17, in four PRBs occupied by the first RS, OFDM symbols occupied by the first RS are the same, and in PRB2 and PRB4 occupied by the second RS, OFDM symbols occupied by the second RS in PRB2 and PRB4 are different.

In the eighth possible implementation, optionally, in a time-frequency resource segment occupied by each RS, on each PRB carrying the RS, distribution of the RS uses a same comb structure; or in a time-frequency resource segment occupied by each RS, on at least two PRBs carrying the RS, distribution of the RS uses different comb structures.

Figure 18A:
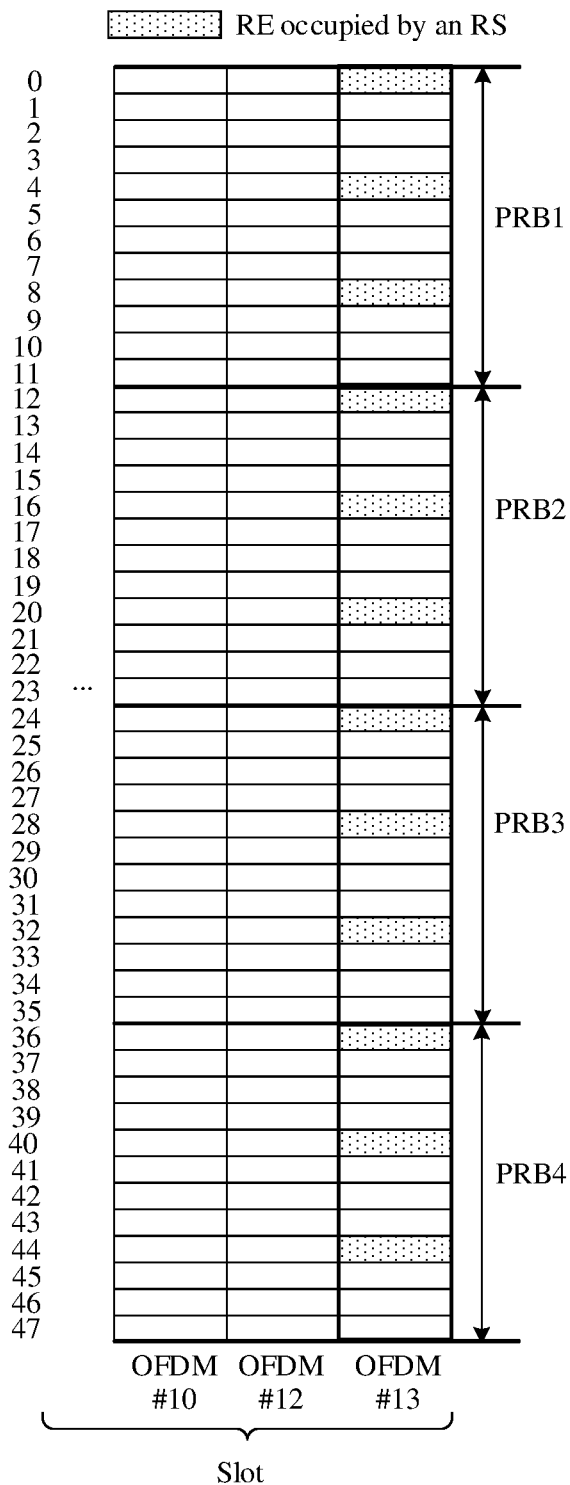
Figure 18B:
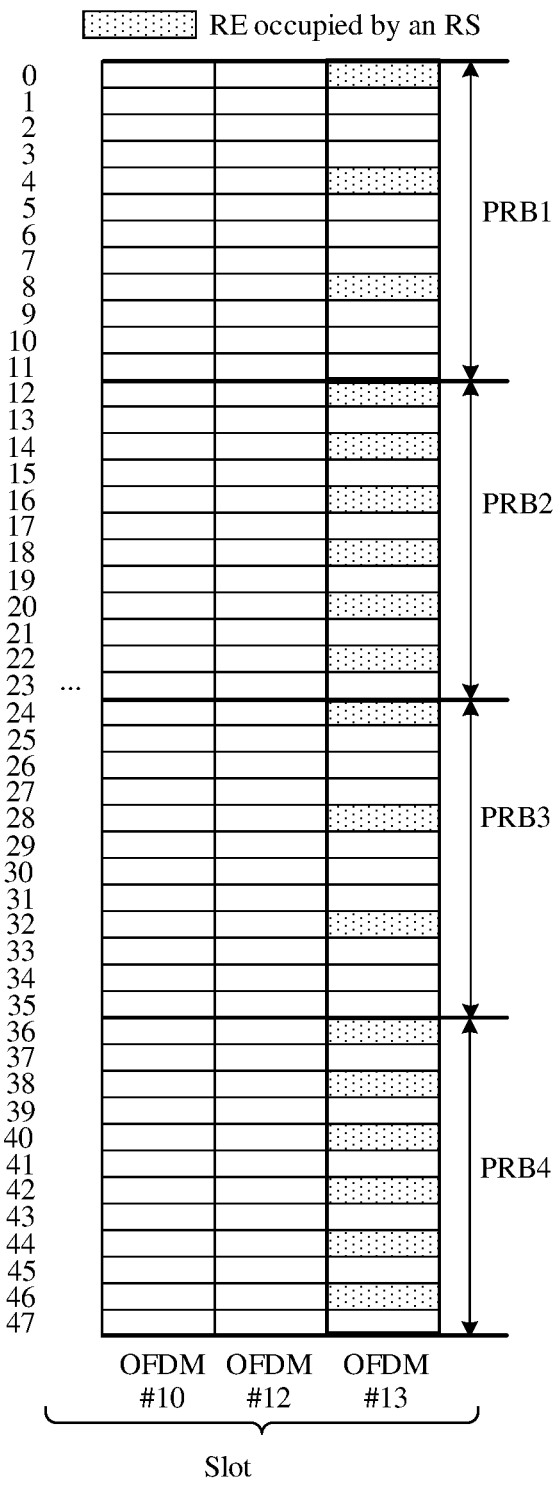

For example, referring to FIG. 18(a), a same comb structure comb 4 is used in four PRBs occupied by one RS. Referring to FIG. 18(b), in four PRBs occupied by one RS, comb structures used on PRB1 and PRB3 are comb 4, and comb structures used on PRB2 and PRB4 are comb 2.

For example, referring to FIG. 19(a), a same comb structure comb 4 is used in two PRBs occupied by one RS. Referring to FIG. 19(b), in two PRBs occupied by one RS, a comb structure used on PRB1 is comb 4, and a comb structure used on PRB3 is comb 2.

In a ninth possible implementation, the N RS groups are periodically distributed, that is, when the N RS groups are considered as a whole, the whole is periodically distributed.

A period of the N periodically distributed RS groups (that is, the period of the N RS groups as a whole) may be referred to as a frequency hopping period. In this case, N is a quantity of frequency hopping times in the frequency hopping period.

Figure 20A:
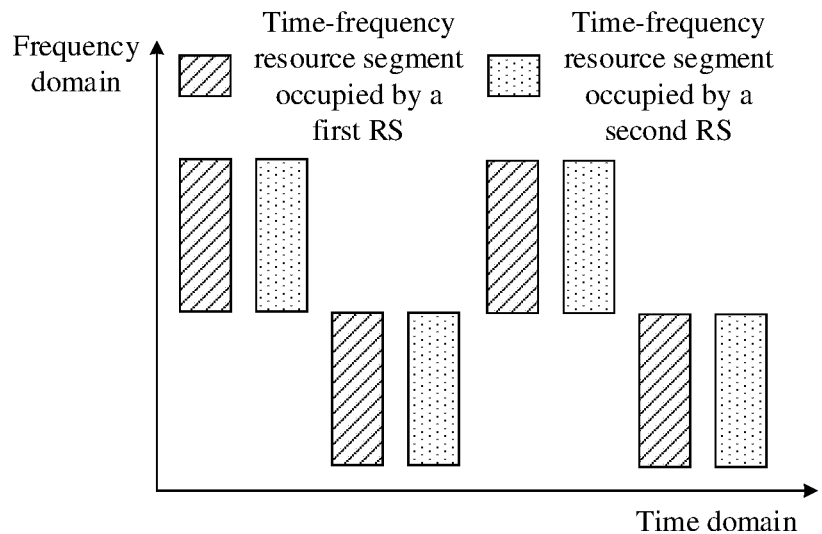
FIG. 20(a) and FIG. 20(b) are a schematic diagram of distribution of time-frequency resource segments according to an embodiment of this application.
Figure 20B:
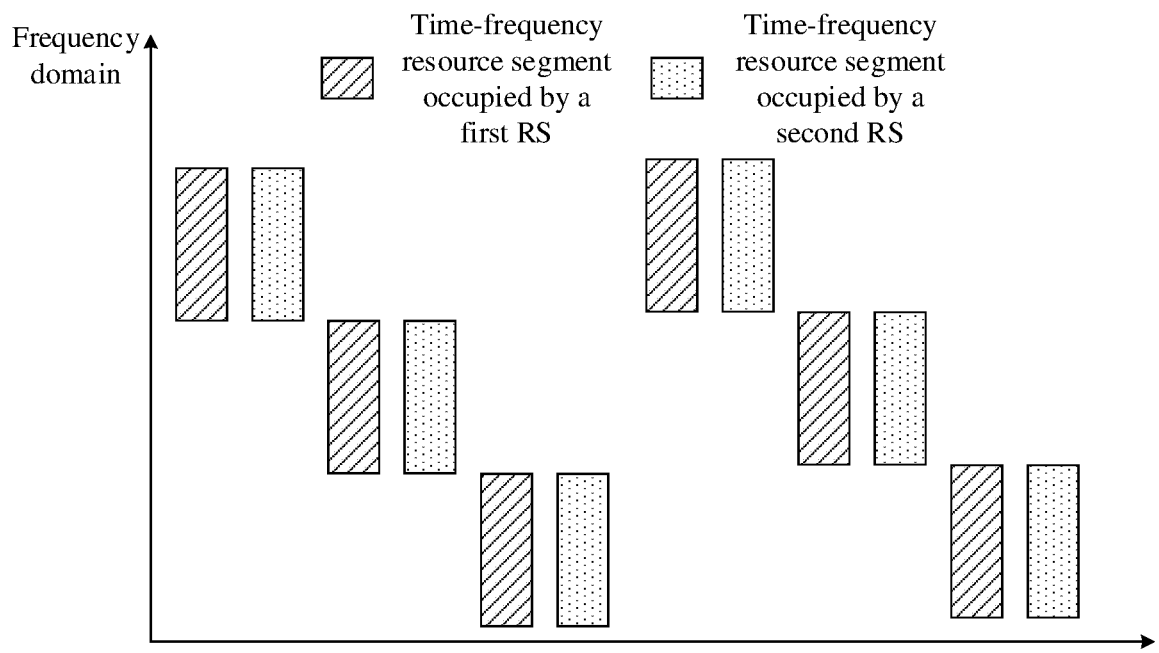

For example, FIG. 20(a) shows the two RS groups shown in FIG. 7(a) after being periodically distributed in time domain. If time domain periods of the first RSs and the second RSs are 20 slots, the frequency hopping period is 40 slots. FIG. 20(b) shows the three RS groups shown in FIG. 7(b) after being periodically distributed in time domain. If time domain periods of the first RSs and the second RSs are 20 slots, the frequency hopping period is 60 slots.

Figure 21:
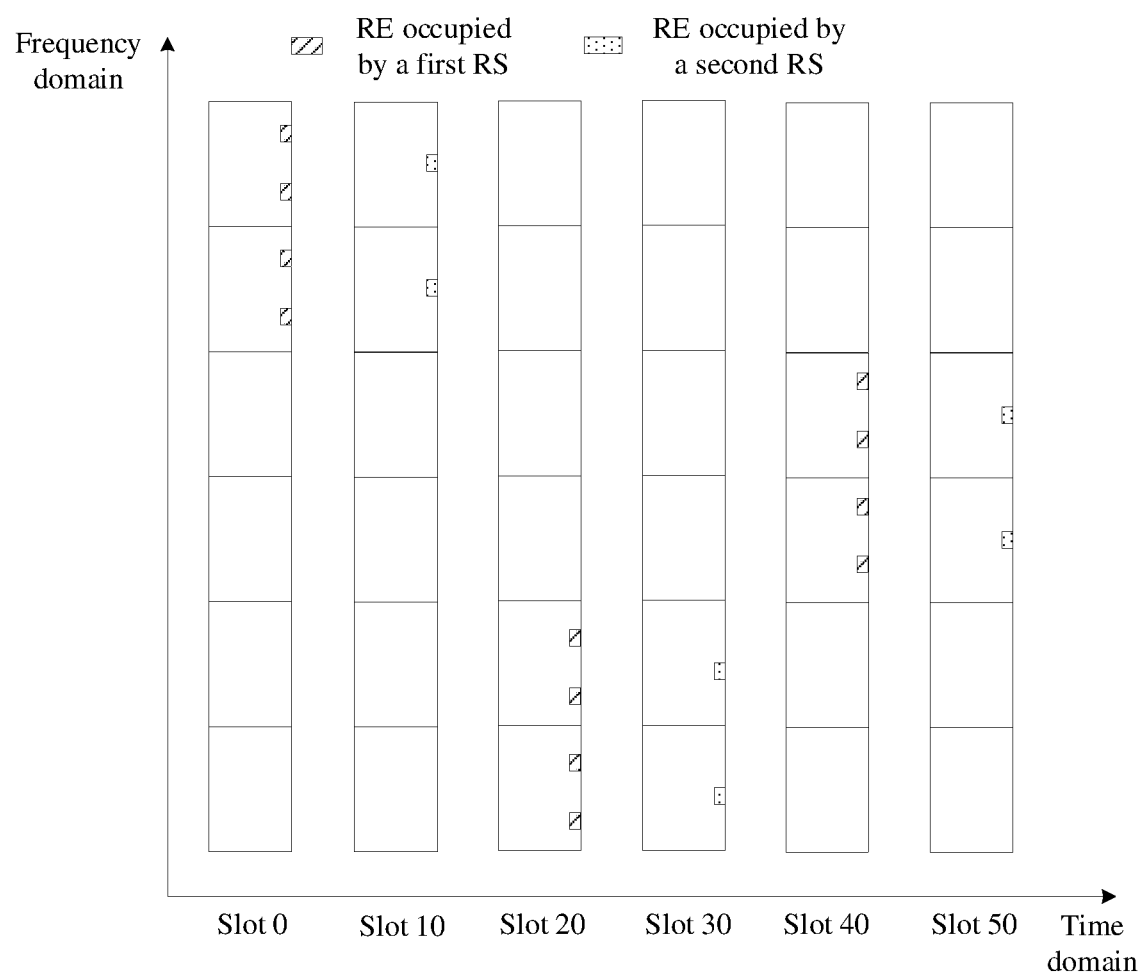
FIG. 21 and FIG. 22 are respectively schematic diagrams of distribution of first RSs and second RSs according to an embodiment of this application.
Figure 22:
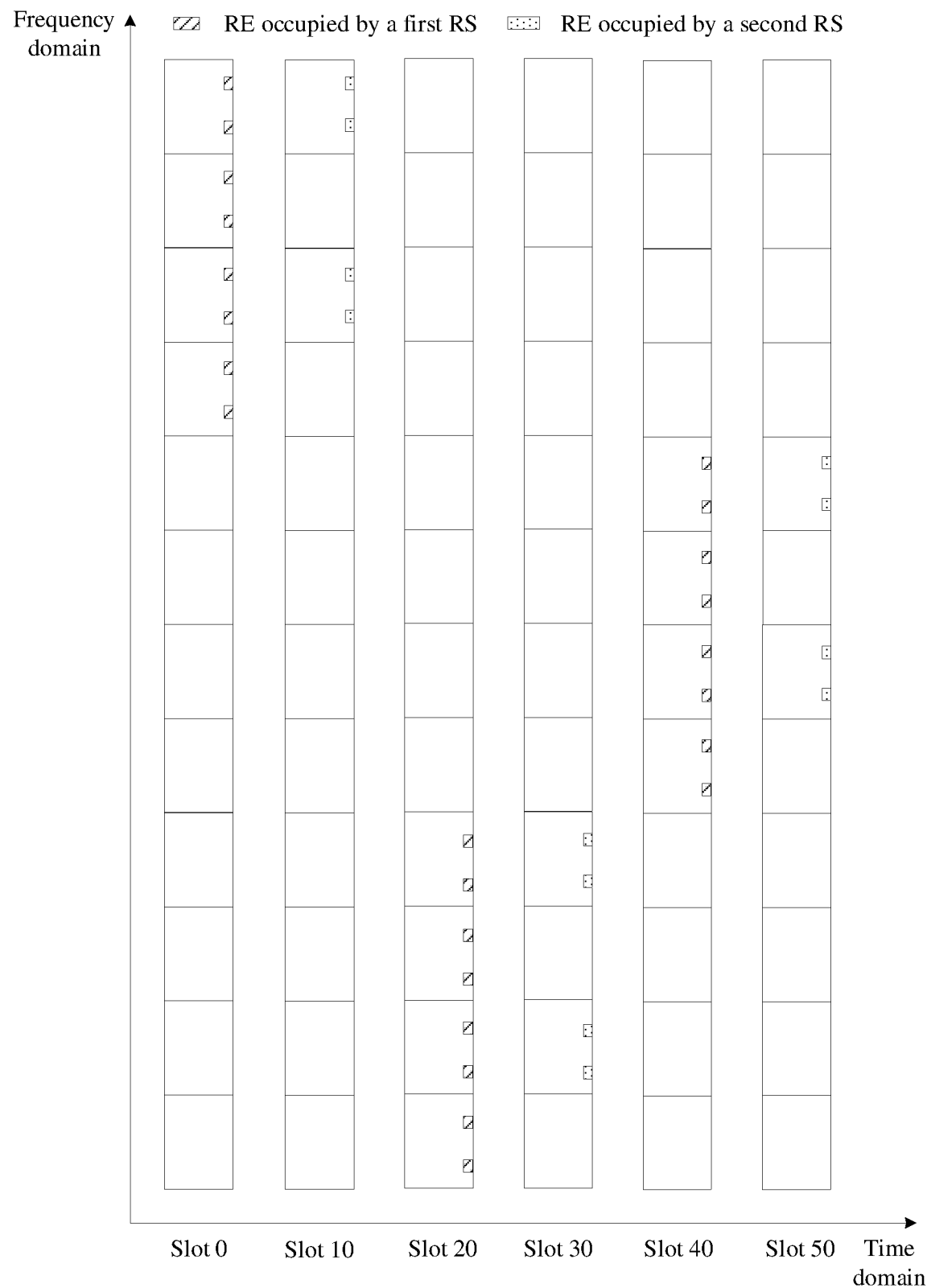

The foregoing various possible implementations may be combined with each other in a case in which the solutions are not contradictory. Based on the foregoing various possible implementations, for example, FIG. 21 and FIG. 22 respectively show possible distribution of N RS groups in time-frequency resources.

In the embodiment, in one RS group, a time-frequency resource segment occupied by a first RS is denoted as a first time-frequency resource segment, and a time-frequency resource segment occupied by a second RS is denoted as a second time-frequency resource segment. Optionally, the following condition is met between the first time-frequency resource segment and the second time-frequency resource segment:

$$\mathrm{mod}([(N_{slot}^{frame,\mu}n_{f,1}+n_{s,f,1}^{u}-T_{offset,1})-(N_{slot}^{frame,\mu}n_{f,0}+n_{s,f,0}^{u}-T_{offset,0})],N*T)=0 \quad \text{(Formula 1), where}$$

mod is a modulo function, $N_{slot}^{frame,\mu}$ represents a quantity of slots in one radio frame corresponding to a current subcarrier spacing configuration $\mu$, $n_{s,f,1}^{u}$ represents an index of the first transmit slot of the second RS corresponding to the current subcarrier spacing configuration $\mu$, $n_{s,f,0}^{u}$ represents an index of the first transmit slot of the first RS corresponding to the current subcarrier spacing configuration $\mu$, $n_{f,1}$ represents an index of a radio frame in which the first transmit slot of the second RS is located, $n_{f,0}$ represents an index of a radio frame where the first transmit slot of the first RS is located, an index of a radio frame is a system frame number (SFN), $T_{offset,1}$ is a slot offset configured for the second RS, $T_{offset,0}$ is slot offset configured for the first RS, T represents a time domain period of the first RS or the second RS, and N is a quantity of frequency hopping times in one frequency hopping period.

At least one of $n_{s,f,1}^{u}$, $T_{offset,1}$, and $n_{f,1}$ is configured by the network device for the second RS, and at least one of $n_{s,f,0}^{u}$, $T_{offset,0}$, and $n_{f,0}$ is configured by the network device for the first RS. When configuring these parameters, the network device needs to ensure that these parameters meet the formula 1 or an equivalent variation of the formula 1.

It may be understood that, after the first slot of the time-frequency resource segment occupied by the first RS and the first slot of the time-frequency resource segment occupied by the second RS meet the formula 1 or the equivalent variation of the formula 1, a frequency hopping location of the second RS is the same as a frequency hopping location of the closest previous first RS, so that joint measurement can be ensured between the first RS and the second RS.

Optionally, the second time-frequency resource segment is located behind the first time-frequency resource segment. It should be noted that the second time-frequency resource segment and the first time-frequency resource segment may be located in a same slot, or may be located in different slots.

Optionally, the method further includes: The network device sends indication information to the terminal. The indication information is used to indicate a relationship between the first RS and the second RS in each RS group. Accordingly, the terminal receives the indication information from the network device, and determines the relationship between the first RS and the second RS in each RS group based on the indication information.

For example, the indication information may be carried in RRC signaling. For example, when a usage element in the RRC signaling is set to interpolation, it indicates that an antenna port of the terminal corresponding to an RS port included in the second RS is at least partially the same as an antenna port of the terminal corresponding to an RS port included in the first RS. In a frequency hopping case, when usage is configured as interpolation, it further indicates that the first RS and the second RS meet the formula 1 or the equivalent variation of the formula 1.

The indication information may be configured for the first RS (or the second RS), or may be configured for the first RS and the second RS. If the indication information is configured for the first RS (or the second RS), the indication information may further include a resource identifier (ID) of the first RS (or the second RS).

In the embodiment, a time-frequency resource of each RS may be stipulated in a protocol, may be configured by the network, or may be determined by using both information stipulated in the protocol and information configured by the network. If the time-frequency resource of each RS is configured by the network, optionally, the method further includes: The network device sends configuration information to the terminal. The configuration information is used to configure a time-frequency resource of at least one of the first RS and the second RS. Accordingly, the terminal receives the configuration information from the network device, and determines time-frequency resources of RSs in the RS group based on the configuration information. In this case, when step 402 is specifically implemented, step 402 may include: The terminal sends the N RS groups to the network device based on the configuration information. Specifically, the terminal may determine time-frequency resources of the first RS and the second RS based on the configuration information, and send the first RS and the second RS on the determined time-frequency resources. The time-frequency resource occupied by the first RS (or the second RS) includes both the occupied time-frequency resource segment and a frequency domain location and a time domain location of an RE occupied by the first RS (or the second RS) on each time-frequency resource segment.

Optionally, the configuration information may be carried in radio resource control (RRC) signaling or media access control (MAC) control element (MAC CE) signaling or downlink control information (DCI) to send the configuration information to the terminal.

The time-frequency resources of the first RS and the second RS in this application may be considered as two different resources, or may be recognized as a same resource. In these two cases, the time-frequency resources of the first RS and the second RS are configured differently. The following separately describes the two cases.

Case 1: The time-frequency resources of the first RS and the second RS are two different resources.

In case 1, the network device independently configures the time-frequency resource of the first RS and the time-frequency resource of the second RS. However, the configured time-frequency resources need to make the first RS and the second RS meet the formula 1 or the equivalent variation of the formula 1. The network device may configure a time-frequency resource for an RS (the first RS or the second RS) in the following manner 1 or manner 2.

Manner 1: The network device configures a pattern identifier of a pattern of a time-frequency resource segment for the terminal.

In this case, information included in the configuration information may be an identifier of the pattern of the time-frequency resource segment. One pattern (Pattern) of the time-frequency resource segment represents a type of location distribution of the RS in the time-frequency resource segment. One pattern of the time-frequency resource segment corresponds to one pattern identifier.

In manner 1, the network device and the terminal may store one or more patterns of one or more time-frequency resource segments. When the network device indicates a pattern identifier of a pattern to the terminal, the terminal may determine the pattern of the time-frequency resource segment based on the pattern identifier.

Manner 2: The network device configures a specific location of the time-frequency resource of the RS for the terminal.

In manner 2, the configuration information may include one or more of the following information: a frequency domain location of the time-frequency resource segment occupied by the RS, a time domain location of the time-frequency resource segment occupied by the RS, a time domain period of the RS, a comb structure used by the RS, a start location (or an end location) of the RS in the time-frequency resource segment, a frequency domain location and a time domain location of the RS in an RE in the time-frequency resource segment.

When the configuration information is used to configure a time-frequency resource of each RS, the terminal may determine the time-frequency resource of each RS based on the information included in the configuration information.

Case 2: The time-frequency resources of the first RS and the second RS are a same resource.

In case 2, the network device configures the time-frequency resource of the first RS and the time-frequency resource of the second RS as a whole. The network device may configure the time-frequency resource for the first RS and the second RS in the following manner 3 or manner 4.

Manner 3: The network device configures a pattern identifier of a pattern of a time-frequency resource segment for the terminal.

In this case, information included in the configuration information may be an identifier of the pattern of the time-frequency resource segment. One pattern of the time-frequency resource segment represents a type of location distribution of the first RS and the second RS in the time-frequency resource segment. One pattern of the time-frequency resource segment corresponds to one pattern identifier.

In manner 3, the network device and the terminal may store one or more patterns of one or more time-frequency resource segments. When the network device indicates a pattern identifier of a pattern to the terminal, the terminal may determine the pattern of the time-frequency resource segment based on the pattern identifier.

Manner 4: The network device configures a specific location of the time-frequency resource of the first RS and the second RS for the terminal.

In manner 4, the configuration information may include one or more of the following information: a frequency domain location of the time-frequency resource segment occupied by the first RS, a time domain location of the time-frequency resource segment occupied by the first RS, an offset of the time-frequency resource of the second RS relative to the time-frequency resource of the first RS, comb structures used by the first RS and the second RS, start locations (or end locations) of the first RS and the second RS in frequency domain, frequency domain locations and time domain locations of REs occupied by the first RS and the second RS in the occupied time-frequency resource segment.

When the configuration information is used to configure the time-frequency resource of the first RS and the offset of the time-frequency resource of the second RS relative to the time-frequency resource of the first RS, the terminal may determine the time-frequency resource of the first RS based on the information included in the configuration information, and derive the time-frequency resource of the second RS based on the offset.

Figure 23:
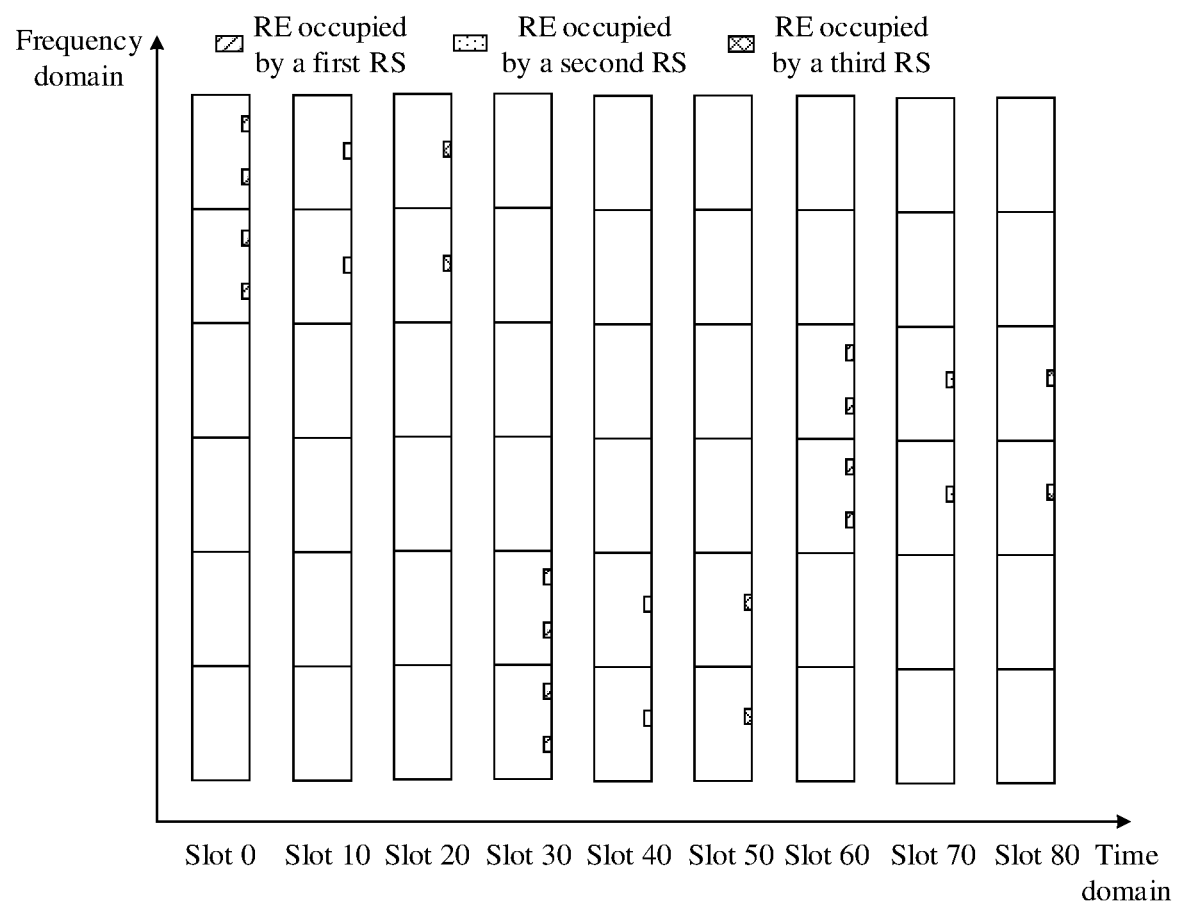
FIG. 23 is a schematic diagram of distribution of first RSs, second RSs, and third RSs according to an embodiment of this application.

In addition, in the embodiment, that one RS group includes only a first RS and a second RS is used as an example to describe the method provided in this embodiment of this application. In an actual implementation, one RS group may include three or more RSs. In this case, any two RSs meet the formula 1 or the equivalent variation of the formula 1. An RS in one RS group except the first RS and the second RS may be an SRS, or may be a DT-RS or a CT-RS, which is not limited in this application. For example, it is assumed that one RS group includes a first RS, a second RS, and a third RS. FIG. 23 shows possible distribution of RSs in a physical resource.

The foregoing mainly describes the solutions in embodiments of this application from a perspective of interaction between network elements. It may be understood that to implement the foregoing functions, the network elements, for example, the network device and the terminal, include at least one of corresponding hardware structures and software modules for implementing the functions. A person skilled in the art should be easily aware that, in combination with units and algorithm steps of the examples described in embodiments disclosed in this specification, this application can be implemented by hardware or a combination of hardware and computer software. Whether a function is performed by hardware or hardware driven by computer software depends on a particular application and a design constraint of the technical solutions. A person skilled in the art may use different methods to implement the described functions for each particular application, but it should not be considered that the implementation goes beyond the scope of this application.

In embodiments of this application, the network device and the terminal may be divided into function units based on the foregoing method examples. For example, each function unit may be obtained through division based on each corresponding function, or two or more functions may be integrated into one processing unit. The integrated unit may be implemented in a form of hardware, or may be implemented in a form of a software function unit. It should be noted that, in embodiments of this application, division into units is an example, and is merely logical function division. During actual implementation, another division manner may be used.

Figure 24:
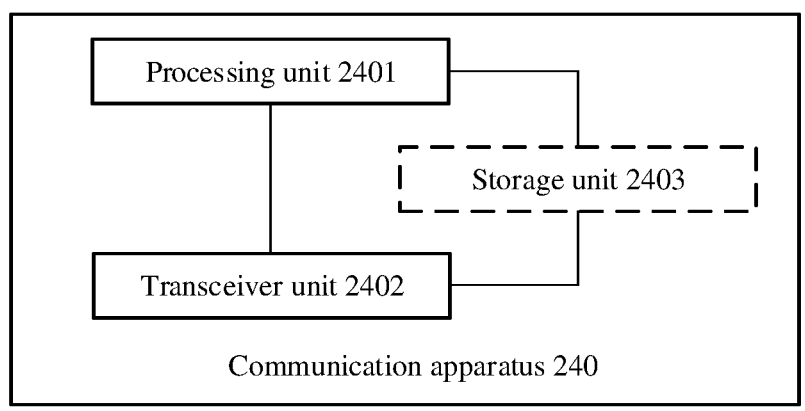
FIG. 24 is a schematic composition diagram of a communication apparatus according to an embodiment of this application.

When the integrated unit is used, FIG. 24 is a possible schematic structural diagram of the communication apparatus (denoted as a communication apparatus 240) in the foregoing embodiments. The communication apparatus 240 includes a processing unit 2401 and a transceiver unit 2402, and may further include a storage unit 2403. The schematic structural diagram shown in FIG. 24 may be used to illustrate structures of the network device and the terminal in the foregoing embodiments.

When the schematic structural diagram shown in FIG. 24 is used to illustrate a structure of the terminal in the foregoing embodiments, the processing unit 2401 is configured to control and manage actions of the terminal. For example, the processing unit 2401 is configured to support the terminal to perform 401 and 402 in FIG. 4 and some or all of actions performed by the terminal in another process described in embodiments of this application. The processing unit 2401 may communicate with another network entity through the transceiver unit 2402, for example, communicate with the network device shown in FIG. 4. The storage unit 2403 is configured to store program code and data of the terminal.

When the schematic structural diagram shown in FIG. 24 is used to illustrate the structure of the terminal in the foregoing embodiments, the communication apparatus 240 may be a terminal, or may be a chip in a terminal.

When the schematic structural diagram shown in FIG. 24 is used to illustrate a structure of the network device in the foregoing embodiments, the processing unit 2401 is configured to control and manage actions of the network device. For example, the processing unit 2401 is configured to support the network device to perform 402 and 403 in FIG. 4 and some or all of actions performed by the network device in another process described in embodiments of this application. The processing unit 2401 may communicate with another network entity through the transceiver unit 2402, for example, communicate with the terminal shown in FIG. 4. The storage unit 2403 is configured to store program code and data of the network device.

When the schematic structural diagram shown in FIG. 24 is used to illustrate the structure of the network device in the foregoing embodiments, the communication apparatus 240 may be a network device, or may be a chip in a network device.

When the communication apparatus 240 is the terminal or the network device, the processing unit 2401 may be a processor or a controller, and the transceiver unit 2402 may be a communication interface, a transceiver, a transceiver, a transceiver circuit, a transceiver apparatus, or the like. The communication interface is a collective term, and may include one or more interfaces. The storage unit 2403 may be a memory. When the communication apparatus 240 is a chip in the terminal or the network device, the processing unit 2401 may be a processor or a controller, and the transceiver unit 2402 may be an input/output interface, a pin, a circuit, or the like. The storage unit 2403 may be a storage unit (for example, a register or a cache) in the chip, or may be a storage unit (for example, a read-only memory or a random access memory) that is in the terminal or the network device and that is located outside the chip.

The transceiver unit may also be referred to as a communication unit. An antenna and a control circuit that have receiving and sending functions in the communication apparatus 240 may be considered as the transceiver unit 2402 in the communication apparatus 240, and a processor that has a processing function in the communication apparatus 240 may be considered as the processing unit 2401 in the communication apparatus 240. Optionally, a component configured to implement a receiving function in the transceiver unit 2402 may be considered as a receiving unit. The receiving unit is configured to perform a receiving step in embodiments of this application. For example, the receiving unit in the network device may be configured to receive the first RS, or may be configured to receive the second RS, and the receiving unit in the terminal may be configured to receive the configuration information. The receiving unit may be a receiver, a receiver, a receiver circuit, or the like. A component configured to implement a sending function in the transceiver unit 2402 may be considered as a sending unit. The sending unit is configured to perform a sending step in embodiments of this application. For example, the sending unit in the network device may be configured to send the configuration information, and the sending unit in the terminal may be configured to send the first RS, or may be configured to send the second RS. The sending unit may be a transmitter, a transmitter, a transmitter circuit, or the like.

When an integrated unit in FIG. 24 is implemented in a form of a software function module and sold or used as an independent product, the integrated unit may be stored in a computer-readable storage medium. Based on such an understanding, the technical solutions of embodiments of this application essentially, or the part contributing to the prior art, or all or a part of the technical solutions may be implemented in a form of a software product. The computer software product is stored in a storage medium and includes several instructions for instructing a computer device (which may be a personal computer, a server, or a network device) or a processor (processor) to perform all or some of the steps of the methods described in embodiments of this application. The storage medium that stores the computer software product includes any medium that can store program code, such as a USB flash drive, a removable hard disk, a read-only memory (read-only memory, ROM), a random access memory (random access memory, RAM), a magnetic disk, or an optical disc.

The unit in FIG. 24 may alternatively be referred to as a module. For example, the processing unit may be referred to as a processing module.

Figure 25:
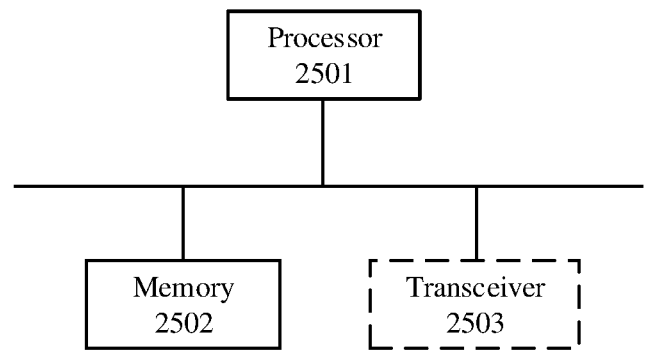
FIG. 25 and FIG. 26 each are a schematic diagram of a hardware structure of a communication apparatus according to an embodiment of this application.
Figure 26:
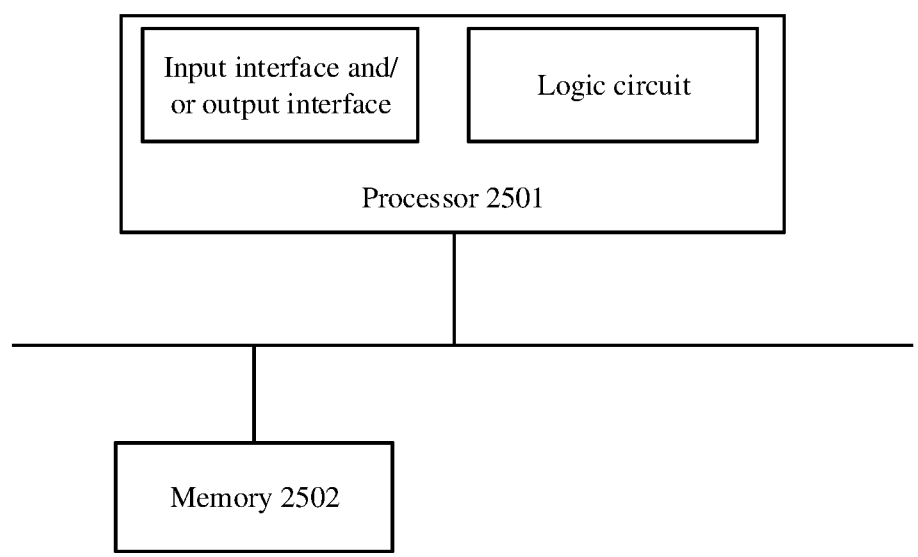

An embodiment of this application further provides a schematic diagram of a hardware structure of a communication apparatus. Refer to FIG. 25 or FIG. 26. The communication apparatus includes a processor 2501, and optionally, further includes a memory 2502 connected to the processor 2501.

The processor 2501 may be a general-purpose central processing unit (CPU), a microprocessor, an application-specific integrated circuit (ASIC), or one or more integrated circuits configured to control program execution of the solutions in this application. The processor 2501 may alternatively include a plurality of CPUs, and the processor 2501 may be a single-core (single-CPU) processor or a multi-core (multi-CPU) processor. The processor herein may refer to one or more devices, circuits, or processing cores configured to process data (for example, computer program instructions).

The memory 2502 may be a ROM or another type of static storage device that can store static information and instructions, or a RAM or another type of dynamic storage device that can store information and instructions, or may be an electrically erasable programmable read-only memory (EEPROM), a compact disc read-only memory (CD-ROM) or another compact disc storage, an optical disc storage (including a compressed optical disc, a laser disc, an optical disc, a digital versatile disc, a Blu-ray disc, or the like), a magnetic disk storage medium or another magnetic storage device, or any other medium that can be used to carry or store expected program code in a form of instructions or a data structure and that can be accessed by a computer. This is not limited in embodiments of this application. The memory 2502 may exist independently, or may be integrated into the processor 2501. The memory 2502 may include computer program code. The processor 2501 is configured to execute the computer program code stored in the memory 2502, to implement the method provided in embodiments of this application.

In a first possible implementation, refer to FIG. 25. The communication apparatus further includes a transceiver 2503. The processor 2501, the memory 2502, and the transceiver 2503 are connected through a bus. The transceiver 2503 is configured to communicate with another device or a communication network. Optionally, the transceiver 2503 may include a transmitter and a receiver. A component configured to implement a receiving function in the transceiver 2503 may be considered as a receiver. The receiver is configured to perform a receiving step in embodiments of this application. For example, the receiver in the network device may be configured to receive the first RS, or may be configured to receive the second RS, and the receiver in the terminal may be configured to receive the configuration information. A component configured to implement a sending function in the transceiver 2503 may be considered as a transmitter. The transmitter is configured to perform a sending step in embodiments of this application. For example, the transmitter in the network device may be configured to send the configuration information, and the transmitter in the terminal may be configured to send the first RS, or may be configured to send the second RS.

Based on the first possible implementation, the schematic structural diagram shown in FIG. 25 may be used to illustrate a structure of the network device or the terminal in the foregoing embodiments.

When the schematic structural diagram shown in FIG. 25 is used to illustrate a structure of the terminal in the foregoing embodiments, the processor 2501 is configured to control and manage actions of the terminal. For example, the processor 2501 is configured to support the terminal to perform 401 and 402 in FIG. 4 and some or all of actions performed by the terminal in another process described in embodiments of this application. The processor 2501 may communicate with another network entity through the transceiver 2503, for example, communicate with the network device shown in FIG. 4. The memory 2502 is configured to store program code and data of the terminal.

When the schematic structural diagram shown in FIG. 25 is used to illustrate a structure of the network device in the foregoing embodiments, the processor 2501 is configured to control and manage actions of the network device. For example, the processor 2501 is configured to support the network device to perform 402 and 403 in FIG. 4 and some or all of actions performed by the network device in another process described in embodiments of this application. The processor 2501 may communicate with another network entity through the transceiver 2503, for example, communicate with the terminal shown in FIG. 4. The memory 2502 is configured to store program code and data of the network device.

In a second possible implementation, the processor 2501 includes a logic circuit and an input interface and/or an output interface. The output interface is configured to perform a sending action in a corresponding method. For example, the output interface in the network device may be configured to send the configuration information, and the output interface in the terminal may be configured to send the first RS, or may be configured to send the second RS. The input interface is configured to perform a receiving action in a corresponding method. For example, the input interface in the network device may be configured to receive the first RS, or may be configured to receive the second RS, and the input interface in the terminal may be configured to receive the configuration information.

Based on the second possible implementation, refer to FIG. 26. The schematic structural diagram shown in FIG. 26 may be used to illustrate a structure of the network device or the terminal in the foregoing embodiments.

When the schematic structural diagram shown in FIG. 26 is used to illustrate a structure of the terminal in the foregoing embodiments, the processor 2501 is configured to control and manage actions of the terminal. For example, the processor 2501 is configured to support the terminal to perform 401 and 402 in FIG. 4 and some or all of actions performed by the terminal in another process described in embodiments of this application. The processor 2501 may communicate with another network entity through the input interface and/or the output interface, for example, communicate with the network device shown in FIG. 4. The memory 2502 is configured to store program code and data of the terminal.

When the schematic structural diagram shown in FIG. 26 is used to illustrate a structure of the network device in the foregoing embodiments, the processor 2501 is configured to control and manage actions of the network device. For example, the processor 2501 is configured to support the network device to perform 402 and 403 in FIG. 4 and some or all of actions performed by the network device in another process described in embodiments of this application. The processor 2501 may communicate with another network entity through the input interface and/or the output interface, for example, communicate with the terminal shown in FIG. 4. The memory 2502 is configured to store program code and data of the network device.

In addition, an embodiment of this application further provides schematic diagrams of hardware structures of a terminal (denoted as a terminal 270) and a network device. For details, refer to FIG. 27 and FIG. 28 respectively.

Figure 27:
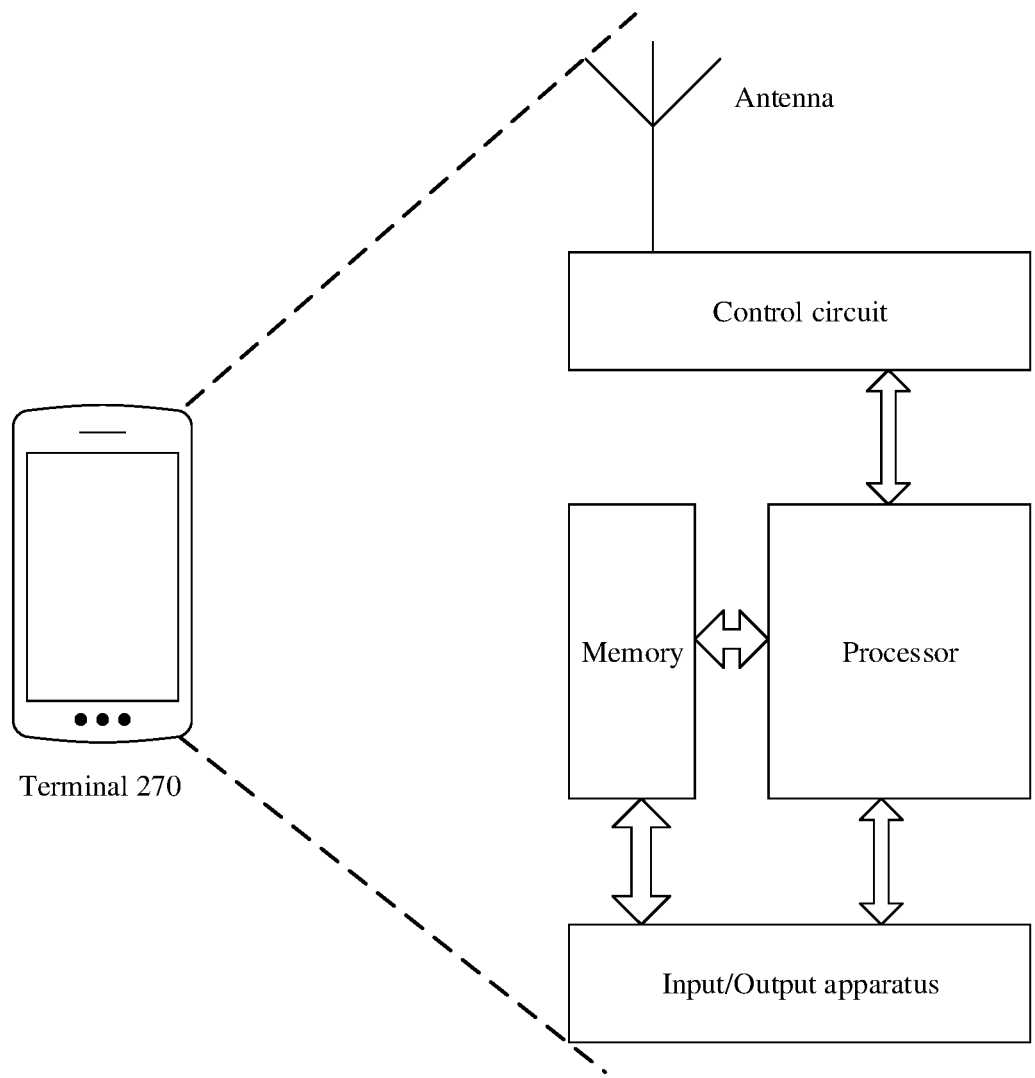
FIG. 27 is a schematic diagram of a hardware structure of a terminal according to an embodiment of this application.

FIG. 27 is a schematic diagram of a hardware structure of the terminal 270. For ease of description, FIG. 27 shows only main components of the terminal. As shown in FIG. 27, the terminal 270 includes a processor, a memory, a control circuit, an antenna, and an input/output apparatus.

The processor is mainly configured to: process a communication protocol and communication data, control the entire terminal, execute a software program, and process data of the software program. For example, the processor is configured to control the terminal to perform 401 and 402 in FIG. 4, and perform some or all actions performed by the terminal in another process described in embodiments of this application. The memory is mainly configured to store the software program and the data. The control circuit (which may also be referred to as a radio frequency circuit) is mainly configured to: perform conversion between a baseband signal and a radio frequency signal, and process the radio frequency signal. A combination of the control circuit and the antenna may also be referred to as a transceiver that is mainly configured to receive and send a radio frequency signal in a form of an electromagnetic wave. The input/output apparatus, for example, a touchscreen, a display, a keyboard, is mainly configured to: receive data input by a user and output data to the user.

After the terminal is powered on, the processor may read the software program in the memory, interpret and execute instructions of the software program, and process the data of the software program. When data (for example, the first RS and the second RS) needs to be sent through the antenna, the processor performs baseband processing on the to-be-sent data, and outputs a baseband signal to the control circuit in the control circuit. After performing radio frequency processing on the baseband signal, the control circuit sends the radio frequency signal in the form of the electromagnetic wave through the antenna. When data (for example, the configuration information) is sent to the terminal, the control circuit receives the radio frequency signal through the antenna, converts the radio frequency signal into a baseband signal, and outputs the baseband signal to the processor. The processor converts the baseband signal into data, and processes the data (for example, determines, based on the configuration information, one or more of the sequence carried and the time-frequency resource occupied by the frequency-domain resource segment that sends the first RS).

A person skilled in the art may understand that, for ease of description, FIG. 27 shows only one memory and one processor. An actual terminal may include a plurality of processors and a plurality of memories. The memory may also be referred to as a storage medium, a storage device, or the like. This is not limited in embodiments of this application.

In an optional implementation, the processor may include a baseband processor and a central processing unit. The baseband processor is mainly configured to process a communication protocol and communication data, and the central processing unit is mainly configured to: control the entire terminal, execute a software program, and process data of the software program. The processor in FIG. 27 integrates functions of the baseband processor and the central processing unit. A person skilled in the art may understand that the baseband processor and the central processing unit may be independent processors, and are connected to each other by using technologies such as a bus. A person skilled in the art may understand that the terminal may include a plurality of baseband processors to adapt to different network standards, and the terminal may include a plurality of central processing units to enhance a processing capability of the terminal. The components in the terminal may be connected through various buses. The baseband processor may also be expressed as a baseband processing circuit or a baseband processing chip. The central processing unit may also be expressed as a central processing circuit or a central processing chip. A function of processing the communication protocol and the communication data may be built in the processor, or may be stored in the memory in a form of a software program. The processor executes the software program to implement a baseband processing function.

Figure 28:
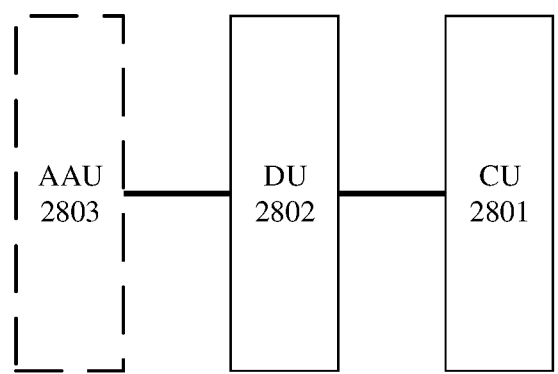
FIG. 28 is a schematic diagram of a hardware structure of a network device according to an embodiment of this application.

The network device in this embodiment of this application may be a complete entity, or may be in a form in which a centralized unit (CU) and a distributed unit (DU) are separated. If the network device is in the form in which the centralized unit (centralized unit, CU) and the distributed unit (DU) are separated, FIG. 28 shows a schematic diagram of a hardware structure of a network device. The network device may include a CU 2801 and a DU 2802. Optionally, the network device further includes an active antenna unit (AAU) 2803.

The CU implements some functions of the network device, and the DU implements some functions of the network device. For example, the CU is responsible for processing a non-real-time protocol and service, and implements functions of a radio resource control (RRC) layer and a packet data convergence protocol (PDCP) layer. The DU is responsible for processing a physical layer protocol and a real-time service, and implements functions of a radio link control (RLC) layer, a media access control (MAC) layer, and a physical (PHY) layer. The AAU implements some physical layer processing functions, radio frequency processing, and a function related to an active antenna. Information at the RRC layer eventually becomes information at the PHY layer, or is converted from information at the PHY layer. Therefore, in this architecture, higher layer signaling, for example, RRC layer signaling or PDCP layer signaling, may also be considered as being sent by the DU or sent by the DU and the AAU. In addition, the CU may be classified as a network device in a RAN, or the CU may be classified as a network device in a core network (CN). This is not limited herein.

It should be understood that the network device shown in FIG. 28 can perform 402 and 403 in FIG. 4 and some or all of actions performed by the network device in another process described in embodiments of this application. Operations, functions, or operations and functions of modules in the network device are separately set to implement corresponding procedures performed in the foregoing method embodiments. For details, refer to the descriptions in the foregoing method embodiments. To avoid repetition, detailed descriptions are properly omitted herein.

In an implementation process, the steps of the methods in embodiments may be implemented by using a hardware integrated logic circuit in a processor or instructions in a form of software. The steps in the methods disclosed with reference to embodiments of this application may be directly performed by a hardware processor, or may be performed by a combination of hardware in the processor and a software module. For other descriptions about the processor in FIG. 27, refer to the descriptions about the processor in FIG. 25 and FIG. 26, and details are not described herein again.

An embodiment of this application further provides a computer-readable storage medium, including instructions. When the instructions are run on a computer, the computer is enabled to perform any one of the foregoing methods.

An embodiment of this application further provides a computer program product including instructions. When the computer program product runs on a computer, the computer is enabled to perform any one of the foregoing methods.

An embodiment of this application further provides a communication system, including the foregoing network device and the foregoing terminal.

All or some of the foregoing embodiments may be implemented by using software, hardware, firmware, or any combination thereof. When a software program is used to implement embodiments, all or some of embodiments may be implemented in a form of a computer program product. The computer program product includes one or more computer instructions. When the computer program instructions are loaded and executed on a computer, the procedures or the functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

Although this application is described with reference to the embodiments, in a process of implementing this application that claims protection, a person skilled in the art may understand and implement another variation of the disclosed embodiments by viewing the accompanying drawings, disclosed content, and the appended claims. In the claims, "comprising" does not exclude another component or another step, and "a" or "one" does not exclude a case of a plurality. A single processor or another unit may implement several functions enumerated in the claims. Some measures are recorded in dependent claims that are different from each other, but this does not mean that the measures cannot be combined to produce a good effect.

Although this application is described with reference to specific features and embodiments thereof, it is clear that various modifications and combinations may be made to them without departing from the spirit and scope of this application. Correspondingly, this specification and the accompanying drawings are merely example descriptions of this application defined by the appended claims, and are considered as any of or all modifications, variations, combinations or equivalents that cover the scope of this application. It is clear that a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. An apparatus, comprising:
   at least one processor, and one or more memories coupled to the at least one processor and storing programming instructions executable by the at least one processor, the programming instructions comprising instructions to perform operations comprising:
   receiving N reference signal (RS) groups sent by a terminal, wherein each RS group of the N RS groups comprises a first RS usable to measure channel state information (CSI) and a second RS usable to measure CSI, in each RS group the first RS occupies a time-domain resource segment that is non-consecutive with a time-domain resource segment occupied by the second RS, and a frequency-domain resource segment occupied by the first RS overlaps a frequency-domain resource segment occupied by the second RS at least in part, each RS group occupies a respective time-frequency resource segment, the respective time-frequency resource segment occupied by each RS group comprises a respective time-domain resource segment and a respective frequency-domain resource segment, frequency-domain resource segments occupied by different RS groups do not overlap, time-domain resource segments occupied by different RS groups do not overlap, and N is an integer greater than 1; and measuring CSI based on at least one RS group in the N RS groups.

2. The apparatus according to claim 1, wherein for each RS group of the N RS groups, the first RS and the second RS in the respective group occupy a same frequency-domain resource segment.

3. The apparatus according to claim 1, wherein the first RSs of the N RS groups are periodically distributed in time domain.

4. The apparatus according to claim 1, wherein the second RSs of the N RS groups are periodically distributed in time domain.

5. The apparatus according to claim 1, wherein RS groups of the N RS groups are periodically distributed in time domain.

6. A method, comprising:
determining, by a terminal, N reference signal (RS) groups, wherein each RS group of the N RS groups comprises a first RS usable to measure channel state information (CSI) and a second RS usable to measure CSI, in each RS group the first RS occupies a time-domain resource segment that is non-consecutive with a time-domain resource segment occupied by the second RS, and a frequency-domain resource segment occupied by the first RS overlaps a frequency-domain resource segment occupied by the second RS at least in part, each RS group of the N RS groups occupies a respective time-frequency resource segment, the respective time-frequency resource segment occupied by each RS group comprises a respective time-domain resource segment and a respective frequency-domain resource segment, frequency-domain resource segments occupied by different RS groups do not overlap, time-domain resource segments occupied by different RS groups do not overlap, and N is an integer greater than 1; and
sending, by the terminal, the N RS groups to a network device.

7. The method according to claim 6, wherein in each RS group of the N RS groups, the first RS and the second RS in the respective RS group occupy a same frequency-domain resource segment.

8. The method according to claim 6, wherein the first RSs of the N RS groups are periodically distributed in time domain.

9. The method according to claim 6, wherein the second RSs of the N RS groups are periodically distributed in time domain.

10. The method according to claim 6, wherein RS groups of the N RS groups are periodically distributed in time domain.

11. The method according to claim 6, wherein the following condition is met between a first time-frequency resource segment and a second time-frequency resource segment:

$\mathrm{mod}([(N_{slot}^{frame,\mu} n_{f,1} + n_{s,f,1}^{u} - T_{offset,1}) - (N_{slot}^{frame,\mu} n_{\_}(f,0) + n_{\_}(s,f,0)^{u} - T_{\_}(offset,0))], N*T) = 0$, wherein the first time-frequency resource segment and the second time-frequency resource segment are respectively time-frequency resource segments occupied by the first RS and the second RS in an RS group of the N RS groups, mod is a modulo function, $N_{slot}^{frame,\mu}$ represents a quantity of slots in one radio frame corresponding to a current subcarrier spacing configuration $\mu$, $n_{s,f,1}^{u}$ represents an index of a first transmit slot of the second RS corresponding to the second time-frequency resource segment corresponding to the current subcarrier spacing configuration $\mu$, $n_{s,f,0}^{u}$ represents an index of a first transmit slot of the first RS corresponding to the first time-frequency resource segment corresponding to the current subcarrier spacing configuration $\mu$, $n_{f,1}$ represents an index of a radio frame in which the first transmit slot of the second RS corresponding to the second time-frequency resource segment is located, $n_{f,0}$ represents an index of a radio frame in which the first transmit slot of the first RS corresponding to the first time-frequency resource segment is located, an index of a radio frame is a system frame number, $T_{offset,1}$ is a slot offset configured for the second RS corresponding to the second time-frequency resource segment, $T_{offset,0}$ is a slot offset configured for the first RS corresponding to the first time-frequency resource segment, T represents a time domain period of the first RS corresponding to the first time-frequency resource segment or the second RS corresponding to the second time-frequency resource segment, and N is a quantity of frequency hopping times in a frequency hopping period.

12. An apparatus, comprising:
at least one processor; and
one or more memories coupled to the at least one processor and storing programming instructions executable by the at least one processor, the programming instructions comprising instructions to perform operations comprising:
determining N reference signal (RS) groups, wherein each RS group of the N RS groups comprises a first RS usable to measure channel state information (CSI) and a second RS usable to measure the CSI, in each RS group the first RS occupies a time-domain resource segment that is non-consecutive with a time-domain resource segment occupied by the second RS, and a frequency-domain resource segment occupied by the first RS overlaps a frequency-domain resource segment occupied by the second RS at least in part, each RS group occupies a respective time-frequency resource segment, the respective time-frequency resource segment occupied by each RS group comprises a respective time-domain resource segment and a respective frequency-domain resource segment, frequency-domain resource segments occupied by different RS groups do not overlap, time-domain resource segments occupied by different RS groups do not overlap, and N is an integer greater than 1; and
sending the N RS groups to a network device.

13. The apparatus according to claim 12, wherein in each RS group of the N RS groups, the first RS and the second RS in the respective RS group occupy a same frequency-domain resource segment.

14. The apparatus according to claim 12, wherein the first RSs of the N RS groups are periodically distributed in time domain.

15. The apparatus according to claim 12, wherein the second RSs of the N RS groups are periodically distributed in time domain.

16. The apparatus according to claim 12, wherein RS groups of the N RS groups are periodically distributed in time domain.

17. The apparatus according to claim 12, wherein the following condition is met between a first time-frequency resource segment and a second time-frequency resource segment:

$\mod([(N_{slot}^{frame,\mu} n_{f,1} + n_{s,f,1}^{u} - T_{offset,1}) - (N_{slot}^{frame,\mu} n\_(f,0) + n\_(s,f,0)\hat{}u - T\_(offset,0))], N*T) = 0$, wherein the first time-frequency resource segment and the second time-frequency resource segment are respectively time-frequency resource segments occupied by the first RS and the second RS in an RS group of the N RS groups, mod is a modulo function, $N_{slot}^{frame,\mu}$ represents a quantity of slots in one radio frame corresponding to a current subcarrier spacing configuration $\mu$, $n_{s,f,1}^{u}$ represents an index of a first transmit slot of the second RS corresponding to the second time-frequency resource segment corresponding to the current subcarrier spacing configuration $\mu$, $n_{s,f,0}^{u}$ represents an index of a first transmit slot of the first RS corresponding to the first time-frequency resource segment corresponding to the current subcarrier spacing configuration $\mu$, $n_{f,1}$ represents an index of a radio frame in which the first transmit slot of the second RS corresponding to the second time-frequency resource segment is located, $n_{f,0}$ represents an index of a radio frame in which the first transmit slot of the first RS corresponding to the first time-frequency resource segment is located, an index of a radio frame is a system frame number, $T_{offset,1}$ is a slot offset configured for the second RS corresponding to the second time-frequency resource segment, $T_{offset,0}$ is a slot offset configured for the first RS corresponding to the first time-frequency resource segment, T represents a time domain period of the first RS corresponding to the first time-frequency resource segment or the second RS corresponding to the second time-frequency resource segment, and N is a quantity of frequency hopping times in a frequency hopping period.

18. The apparatus according to claim 1, wherein in each RS group the frequency-domain resource segment occupied by the first RS overlaps the frequency-domain resource segment occupied by the second RS only in part.

19. The method according to claim 6, wherein in each RS group the frequency-domain resource segment occupied by the first RS overlaps the frequency-domain resource segment occupied by the second RS only in part.

20. The apparatus according to claim 12, wherein in each RS group the frequency-domain resource segment occupied by the first RS overlaps the frequency-domain resource segment occupied by the second RS only in part.

* * * * *